United States Patent
Choi et al.

(10) Patent No.: US 12,205,024 B2
(45) Date of Patent: Jan. 21, 2025

(54) COMPUTING DEVICE AND METHOD OF CLASSIFYING CATEGORY OF DATA

(71) Applicants: SAMSUNG ELECTRONICS CO., LTD., Suwon-si (KR); INDUSTRY-ACADEMIC COOPERATION FOUNDATION, YONSEI UNIVERSITY, Seoul (KR)

(72) Inventors: Seunghyuk Choi, Suwon-si (KR); Min Song, Seoul (KR); Sumi Lee, Suwon-si (KR); Soyoung Kim, Suwon-si (KR)

(73) Assignees: SAMSUNG ELECTRONICS CO., LTD., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 1038 days.

(21) Appl. No.: 17/112,022

(22) Filed: Dec. 4, 2020

(65) Prior Publication Data

US 2021/0201143 A1     Jul. 1, 2021

(30) Foreign Application Priority Data

Dec. 27, 2019    (KR) ........................ 10-2019-0176272

(51) Int. Cl.
    *G06N 3/08*      (2023.01)
    *G06F 40/30*      (2020.01)
    *G06N 3/045*      (2023.01)

(52) U.S. Cl.
    CPC ............... *G06N 3/08* (2013.01); *G06F 40/30* (2020.01); *G06N 3/045* (2023.01)

(58) Field of Classification Search
    CPC .......... G06N 3/08; G06N 3/045; G06N 3/088; G06F 40/30; G06F 16/35
See application file for complete search history.

(56) References Cited

U.S. PATENT DOCUMENTS

| 6,507,829 B1 | 1/2003 | Richards et al. |
| 6,556,987 B1 | 4/2003 | Brown et al. |

(Continued)

FOREIGN PATENT DOCUMENTS

| KR | 10-1938212 | 10/2019 |
| WO | WO-2017124116 A1 * | 7/2017 |

(Continued)

OTHER PUBLICATIONS

H. Ezzat, S. Ezzat, S. El-Beltagy and M. Ghanem, "TopicAnalyzer: A system for unsupervised multi-label Arabic topic categorization," 2012 International Conference on Innovations in Information Technology (IIT), United Arab Emirates, 2012, pp. 220-225, doi: 10.1109/INNOVATIONS.2012.6207736. (Year: 2012).*

(Continued)

*Primary Examiner* — Andrew L Tank
(74) *Attorney, Agent, or Firm* — Nixon & Vanderhye, P.C.

(57) ABSTRACT

A device and method for classifying a category of data are provided. The device includes: a memory storing one or more instructions; and at least one processor configured to execute the one or more instructions stored in the memory to cause the processor to: identify a classification system of a category of data comprising a classification criterion of the category of the data and a plurality of keywords; obtain data comprising at least one sentence; and determine at least one category with respect to the at least one sentence of the data based on the classification system of the category of the data using a neural network that performs classification by unsupervised learning.

18 Claims, 11 Drawing Sheets

(56) References Cited

U.S. PATENT DOCUMENTS

| | | | |
|---|---|---|---|
| 7,971,150 | B2 | 6/2011 | Raskutti et al. |
| 9,069,798 | B2 | 6/2015 | Hershey et al. |
| 9,715,495 | B1* | 7/2017 | Tacchi .................... G06F 40/30 |
| 2012/0179633 | A1 | 7/2012 | Ghani et al. |
| 2013/0185106 | A1* | 7/2013 | Donatone ............... G06Q 50/01 |
| | | | 705/7.14 |
| 2015/0310862 | A1* | 10/2015 | Dauphin ................. G06F 40/30 |
| | | | 704/257 |
| 2017/0300563 | A1 | 10/2017 | Kao et al. |
| 2018/0293978 | A1* | 10/2018 | Sinha .................... G06F 40/232 |
| 2020/0046285 | A1* | 2/2020 | Shimmei ............... A61B 5/7282 |
| 2020/0227026 | A1* | 7/2020 | Rajagopal ............. G06F 16/244 |
| 2020/0257762 | A1* | 8/2020 | Eskamani ............... G06N 20/00 |
| 2020/0401885 | A1* | 12/2020 | Hewitt ..................... G06N 3/08 |

FOREIGN PATENT DOCUMENTS

| | | | |
|---|---|---|---|
| WO | 2018/163162 | 9/2018 | |
| WO | WO-2019173860 A1 * | 9/2019 | ....... G06F 16/24568 |

OTHER PUBLICATIONS

A. Hassan and A. Mahmood, "Convolutional Recurrent Deep Learning Model for Sentence Classification," in IEEE Access, vol. 6, pp. 13949-13957, 2018, doi: 10.1109/ACCESS.2018.2814818. (Year: 2018).*

J. Deng and F. Ren, "Text Classification with Keywords and Co-occurred Words in Two-stream Neural Network," 2018 5th IEEE International Conference on Cloud Computing and Intelligence Systems (CCIS), Nanjing, China, 2018, pp. 456-460, doi: 10.1109/ CCIS.2018.8691302. (Year: 2018).*

Alami, N., En-nahnahi, N., Ouatik, S.A et al. Using Unsupervised Deep Learning for Automatic Summarization of Arabic Documents. Arab J Sci Eng 43, 7803-7815 (2018). https://doi.org/10.1007/s13369-018-3198-y (Year: 2018).*

Arora, M., Kansal, V. Character level embedding with deep convolutional neural network for text normalization of unstructured data for Twitter sentiment analysis. Soc. Netw. Anal. Min. 9, 12 (2019). https://doi.org/10.1007/s13278-019-0557-y (Year: 2019).*

Kowsari, Kamran, Kiana Jafari Meimandi, Mojtaba Heidarysafa, Sanjana Mendu, Laura Barnes, and Donald Brown. "Text classification algorithms: A survey." Information 10, No. 4 (2019): 150, arXiv: 1904.08067 (Year: 2019).*

Valtonen, Laura. "Unsupervised Machine Learning for Event Categorization in Business Intelligence." Master's thesis, 2019, https://urn.fi/URN:NBN:fi:tty-201905311818 (Year: 2019).*

W. Suyan, S. Entong, L. Binyang and W. Jiangrui, "TextCNN-based Text Classification for E-government," 2019 6th International Conference on Information Science and Control Engineering (ICISCE), Shanghai, China, 2019, pp. 929-934, doi: 10.1109/ICISCE48695.2019.00187. (Year: 2019).*

J. Wang, F. Song, K. Walia, J. Farber and R. Dara, "Using Convolutional Neural Networks to Extract Keywords and Keyphrases: A Case Study for Foodborne Illnesses," 2019 18th IEEE International Conference on Machine Learning and Applications (ICMLA), Boca Raton, FL, USA, 2019, pp. 1398-1403 (Year: 2018).*

E. S. Chifu, T. S. Letia and V. R. Chifu, "Unsupervised Aspect Level Sentiment Analysis Using Self-Organizing Maps," 2015 17th International Symposium on Symbolic and Numeric Algorithms for Scientific Computing (SYNASC), Timisoara, Romania, 2015, pp. 468-475, doi: 10.1109/SYNASC.2015.75. (Year: 2015).*

International Search Report and Written Opinion issued Mar. 2, 2021 in corresponding International Application No. PCT/KR2020/017566.

* cited by examiner

COMPUTING DEVICE AND METHOD OF CLASSIFYING CATEGORY OF DATA

CROSS-REFERENCE TO RELATED APPLICATION

This application is based on and claims priority under 35 U.S.C. § 119 to Korean Patent Application No. 10-2019-0176272, filed on Dec. 27, 2019, in the Korean Intellectual Property Office, the disclosure of which is incorporated by reference herein in its entirety.

BACKGROUND

1. Field

The disclosure relates to a computing device and method of classifying a category of data.

2. Description of Related Art

With the recent development of the Internet and social media, technologies for obtaining opinions of various users through personal media are emerging. For example, business operators may develop innovative products by obtaining opinions of various users through personal media and by considering the obtained opinions. However, while data has increased exponentially with the development of the Internet and social media, there are limitations in accurately understanding the meaning of numerous data because a significant portion of the data includes unstructured data without a fixed format. Accordingly, clustering technology and classification technology have been developed as technologies for determining categories of data. Clustering technology is an algorithm that divides data into random subjects with high similarity and identifies which keywords the data includes for each subject. Clustering technology is unsupervised learning, and because a machine automatically forms groups, categories may be inconsistent with subjects wanted by users or the users may have difficulty in understanding the meaning of subjects. In addition, classification technology is supervised learning and is an algorithm that classifies categories based on a potential structure such as a hierarchical structure that exists between categories, based on the relationship between categories. Classification technology is supervised learning in which there is a limitation in the classification of exponentially increased unstructured data because a defined classification construction system is required.

Accordingly, in order to comprehensively analyze and accurately understand various data, a technology capable of classifying data according to a classification system wanted by a user while using unsupervised learning is required.

SUMMARY

Embodiments of the disclosure provide a computing device and method of classifying a category of data such that a category of the data may be effectively classified according to the user's intention.

Additional aspects will be set forth in part in the description which follows and, in part, will be apparent from the description.

According to an example embodiment of the disclosure, a computing device includes: a memory storing one or more instructions; and at least one processor configured to execute the one or more instructions stored in the memory to cause the processor to: identify a classification system of category of data including a classification criterion of the category of the data and a plurality of keywords; obtain data including at least one sentence; and determine at least one category with respect to the at least one sentence of the data based on the classification system of the category of the data using a neural network configured to perform classification by unsupervised learning.

According to an example embodiment of the disclosure, the at least one processor may be further configured to: identify classification levels of the category of the data, and determine the at least one category with respect to the at least one sentence of unstructured data based on the classification levels of the category of the data.

According to an example embodiment of the disclosure, the at least one processor may be further configured to: determine at least one batch including a plurality of sentences of the unstructured data, repeatedly determine an expected category with respect to the plurality of sentences included in the at least one batch, and determine the at least one category with respect to the at least one sentence of the unstructured data based on the determined expected category.

According to an example embodiment of the disclosure, the at least one processor may be further configured to: using the neural network, determine that the at least one category with respect to the at least one sentence cannot be determined according to the classification system of the category of the data based on a result of determining, update the classification system of the category of the data, and determine the at least one category with respect to the at least one sentence of the data based on the updated classification system of the category of the data.

According to an example embodiment of the disclosure, the at least one processor may be further configured to: determine a plurality of category candidates of the data using a first neural network and using a second neural network, determine at least one category of the plurality of category candidates of the data as the at least one category with respect to the at least one sentence of the data.

According to an example embodiment of the disclosure, the data may include social media data created by a plurality of users, the classification system of the category of the data may include a classification system according to a product function, and the at least one processor may be configured to obtain requirements of the plurality of users based on the determined at least one category of the data.

According to an example embodiment of the disclosure, the at least one processor may be further configured to: generate first training data obtained by performing pre-processing and sentence segmentation on the obtained data; based on the first training data, generate second training data including at least one of a morphological similar word or a semantic similar word of a word for each sentence; based on the second training data, generate third training data obtained by performing sentence embedding; and based on the third learning data, determine the at least one category with respect to the at least one sentence of the data according to the classification system of the category of the data.

According to an example embodiment of the disclosure, the at least one processor may be further configured to: based on the obtained data, perform sentence segmentation according to sentence boundary recognition, and based on a result of the performing of the sentence segmentation, generate the first training data by removing unnecessary terms from the data.

According to an example embodiment of the disclosure, the at least one processor may be further configured to: generate first modification data in which words excluding words matching the plurality of keywords are removed from the first training data; generate second modification data in which morphological similar words of the words of the first modification data extend using an edit distance algorithm; and based on word embedding, generate the second training data including a word vector in which word semantic similar words of words of the second modification data extend.

According to an example embodiment of the disclosure, the words matching the plurality of keywords may include at least one of a word included in the plurality of keywords or a word matching the plurality of keywords based on approximate string matching.

According to an example embodiment of the disclosure, the at least one processor may be further configured to: obtain an average weight with respect to at least one word vector from the second training data; smooth the obtained average weight using singular value decomposition (SVD); and generate the third training data as a result of the performing of the sentence embedding using the smoothed average weight.

According to an example embodiment of the disclosure, the average weight with respect to the at least one word vector may be obtained using a weight of the at least one word vector, based on a maximum likelihood estimate, and the weight of the at least one word vector may be a weight calculated with respect to at least one word using term frequency-inverse document frequency (TF*IDF).

According to an example embodiment of the disclosure, the at least one processor may be further configured to: determine a centroid that is most similar to the third training data among the classification system of the category of the data; and determine the at least one category with respect to the least one sentence of the data based on the determined centroid.

According to an example embodiment of the disclosure, a method of operating a computing device includes: identifying a classification system of category of data including a classification criterion of the category of the data and a plurality of keywords; obtaining data including at least one sentence; and determining at least one category with respect to the at least one sentence of the data based on the classification system of the category of the data using a neural network, the neural network performing classification by unsupervised learning.

According to an example embodiment of the disclosure, the method may further include: determining, using the neural network, that the at least one category with respect to the at least one sentence cannot be determined according to the classification system of the category of the data, based on a result of determining, updating the classification system of the category of the data, and determining the at least one category with respect to the at least one sentence of the data based on the updated classification system of the category of the data.

According to an example embodiment of the disclosure, the data may include social media data created by a plurality of users, the classification system of the category of the data may include a classification system according to a product function, and the operating method may further include obtaining requirements of the plurality of users based on the determined at least one category of the data.

According to an example embodiment of the disclosure, the determining of the at least one category with respect to the at least one sentence of the data may include generating first training data obtained by performing pre-processing and sentence segmentation on the obtained data; based on the first training data, generating second training data including at least one of a morphological similar word or a semantic similar word of a word for each sentence; based on the second training data, generating third training data obtained by performing sentence embedding; and based on the third learning data, determining the at least one category with respect to the at least one sentence of the data according to the classification system of the category of the data.

According to an example embodiment of the disclosure, the generating of the second training data may include generating first modification data in which words excluding words matching the plurality of keywords are removed from the first training data; generating second modification data in which morphological similar words of the words of the first modification data extend using an edit distance algorithm; and based on word embedding, generating the second training data including a word vector in which word semantic similar words of words of the second modification data extend.

According to an example embodiment of the disclosure, the words matching the plurality of keywords may include at least one of a word included in the plurality of keywords or a word matching the plurality of keywords based on approximate string matching.

According to an example embodiment of the disclosure, the generating of the third training data may include obtaining an average weight with respect to at least one word vector from the second training data; smoothing the obtained average weight using singular value decomposition (SVD); and generating the third training data as a result of the performing of the sentence embedding using the smoothed average weight.

According to an example embodiment of the disclosure, the determining of the at least one category with respect to the at least one sentence of the data may include determining a centroid that is most similar to the third training data among the classification system of the category of the data; and determining the at least one category with respect to the least one sentence of the data based on the determined centroid.

According to an example embodiment of the disclosure, a program product stored in a non-transitory computer-readable recording medium to execute a method according to an embodiment of the disclosure on a computer is provided.

According to an example embodiment of the disclosure, a non-transitory computer-readable recording medium storing one or more program is provided, wherein, when the one or more programs are executed by one or more processors of a computing device, the one or more programs cause the computing device to: identify a classification system of category of data including a classification criterion of the category of the data and a plurality of keywords; obtain data including at least one sentence; and determine at least one category with respect to the at least one sentence of the data based on the classification system of the category of the data using a neural network, the neural network performing classification by unsupervised learning.

According to an example embodiment of the disclosure, a non-transitory computer-readable recording medium storing a data format of a message used in an embodiment of the disclosure is provided.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
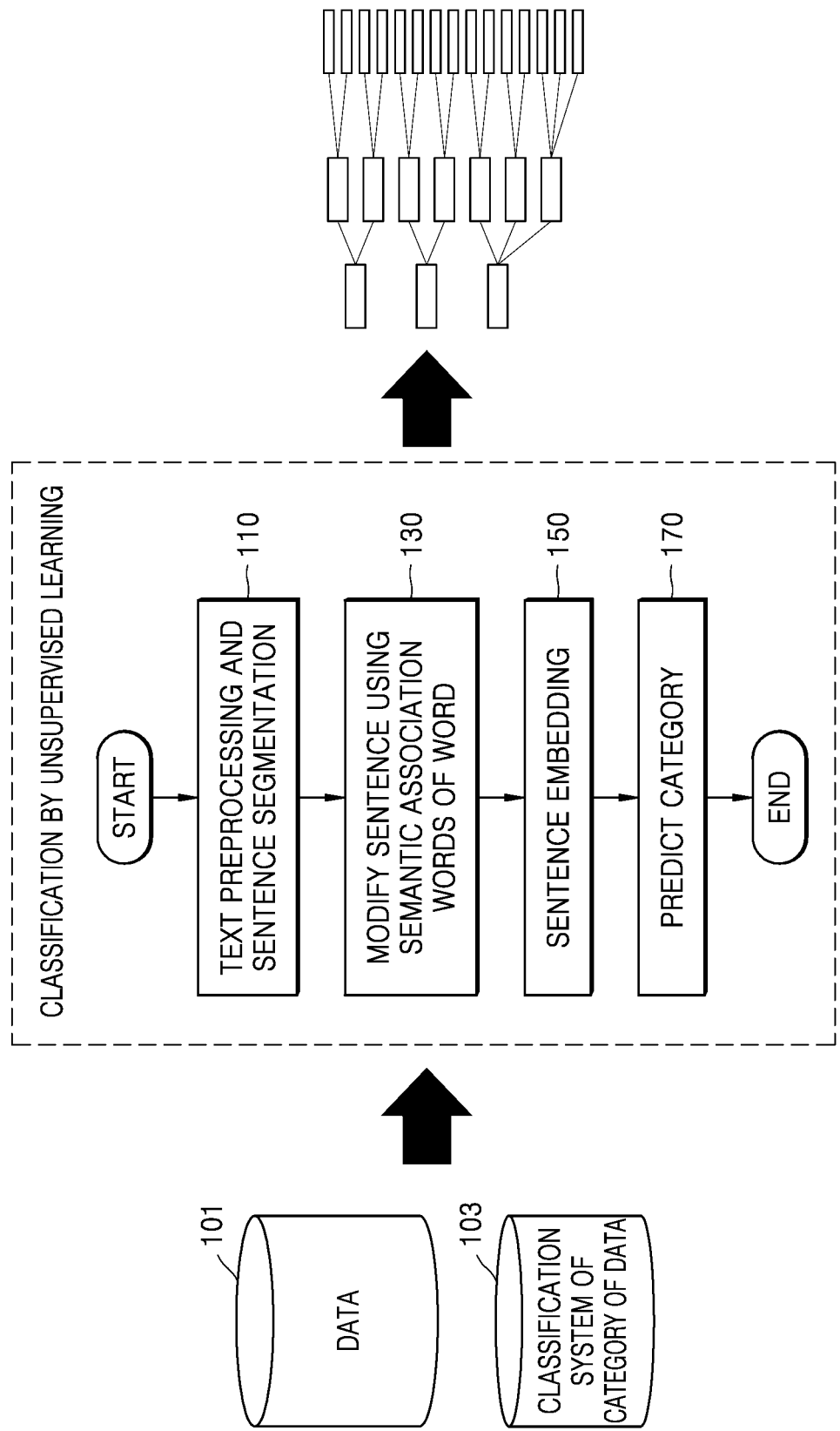
FIG. 1 is a diagram illustrating an example method of classifying data based on a classification system of category of the data, according to various embodiments.

Hereinafter, various example embodiments of the disclosure will be described in greater detail with reference to the accompanying drawings. However, the disclosure may be implemented in various different forms and is not limited to the various example embodiments described herein. Particular implementations described in the disclosure are merely examples, and do not limit the scope of the disclosure in any way. For the sake of conciseness, descriptions of related electronic configurations, control systems, software, and other functional aspects of the systems may be omitted.

To clearly describe the disclosure, parts irrelevant to the description may be omitted in the drawings, and like elements will be designated by like numerals throughout the specification. Connection lines or connection members between elements shown in the drawings represent example functional connections and/or physical or logical connections. Connections between elements may be presented as various alternative or additional functional connections, physical connections, or logical connections in a practical apparatus.

With respect to the terms used in the disclosure, general terms currently and widely used are selected in view of function with respect to the disclosure. However, the terms may vary according to an intention of a technician practicing in the pertinent art, an advent of new technology, etc. In some cases, terms may be chosen arbitrarily, and in such cases, definitions thereof will be described in the corresponding description of the disclosure. Accordingly, the terms used in the description should not necessarily be construed as simple names of the terms, but be defined based on meanings of the terms and overall contents of the disclosure.

A singular term includes a plural form unless otherwise indicated. The terms, "include," "comprise," "is configured to," etc. of the description are used to indicate the presence of features, numbers, steps, operations, elements, parts or combination thereof, and do not exclude the possibilities of combination or addition of one or more features, numbers, steps, operations, elements, parts or combination thereof. In particular, the numbers are examples to aid understanding, and the various example embodiments of the disclosure should not be understood as being limited by the numbers described.

In addition, terms such as first and second may be used to describe various components, but the components should not be limited by these terms. These terms may simply be used to distinguish one component from another component. Phrases such as "in an embodiment" appearing in various places in the disclosure are not necessarily all referring to the same embodiment.

Throughout the disclosure, the expression "at least one of a, b or c" indicates only a, only b, only c, both a and b, both a and c, both b and c, all of a, b, and c, or variations thereof.

An embodiment of the disclosure may be described in terms of functional blocks and various processing operations. Such functional blocks may be partly or wholly implemented by various numbers of hardware and/or software components that execute particular functions. For example, the functional blocks of the disclosure may be implemented by one or more microprocessors or by circuit configurations for a certain function. In addition, for example, functional blocks according to the disclosure may be implemented with any programming or scripting language. The functional blocks may be implemented in algorithms that are executed on one or more processors. Furthermore, the disclosure described herein could employ any number of techniques according to the related art for electronics configuration, signal processing and/or control, data processing and the like.

In describing the disclosure, when it is determined that a detailed description of a related known function or component may unnecessarily obscure the subject matter of the disclosure, a detailed description thereof may be omitted. When necessary for convenience of explanation, the device and the method will be described together.

Functions related to artificial intelligence according to the disclosure operate through a processor and a memory. The processor may include one processor or a plurality of processors. In this case, one processor or a plurality of processors may be a general-purpose processor such as a CPU, AP, or Digital Signal Processor (DSP), a graphics-only processor such as a GPU, a Vision Processing Unit (VPU), or an artificial intelligence-only processor such as an NPU. One processor or a plurality of processors control to process input data according to a predefined operation rule or an artificial intelligence model stored in a memory. Alternatively, when one processor or a plurality of processors are dedicated artificial intelligence processors, the artificial intelligence dedicated processor may be designed with a hardware structure specialized for processing a specific artificial intelligence model.

The predefined operation rule or the artificial intelligence model may be created through training. Here, creating through training may refer, for example, to the basic artificial intelligence model being trained by a learning algorithm using a plurality of training data such that the predefined operation rule or the artificial intelligence model set to perform a wanted characteristic (or purpose) is created. Such training may be performed in the device itself on which artificial intelligence according to the disclosure is performed, or may be performed through a separate server and/or system. Examples of the learning algorithm include supervised learning, unsupervised learning, semi-supervised learning, or reinforcement learning, but are not limited to the above-described examples.

The artificial intelligence model may include a plurality of neural network layers. Each of the plurality of neural network layers has a plurality of weight values and performs a neural network operation through an operation between an operation result of a previous layer and a plurality of weights. The plurality of weights of the plurality of neural network layers may be optimized by a training result of the artificial intelligence model. For example, the plurality of weights may be updated to reduce or minimize a loss value or a cost value obtained from the artificial intelligence model during a training process. The artificial neural network may include a deep neural network (DNN), for example, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), or deep Q-Networks, and the like, but is not limited to the above-described example.

Hereinafter, the disclosure will be described in greater detail with reference to the accompanying drawings.

FIG. 1 is a diagram illustrating an example method of classifying data 101 based on a classification system 103 of category of the data 101 according to various embodiments.

Referring to FIG. 1, a computing device may determine at least one category of data 101 based on the data 101 and the classification system 103 of category of the data 101. In an embodiment of the disclosure, the classification system 103 of category of the data 101 may include a classification criterion of category of the data 101 and a plurality of keywords. The plurality of keywords may include only a small amount of keywords for presenting a guide for the classification criterion to the computing device when a user determines category of the data 101. The data 101 may include not only structured data but also unstructured data. According to an embodiment of the disclosure, in classifying the unstructured data using a neural network that performs unsupervised learning based on the classification system 103 of category of the data 101, the computing device may classify the unstructured data based on criterion wanted by the user.

In operation 110 of the method of classifying the data 101 based on the classification system 103 of category of data 101, the computing device may perform a text preprocessing process on at least one sentence included in the data 101 and segment the at least one sentence included in the data 101. In an embodiment of the disclosure, the text preprocessing process is a job of preprocessing text suitable for a purpose or a user's intention, and may perform tokenization, cleaning, normalization, stemming, lemmatization, stopword removal, regular expression text preprocessing, integer encoding, one-hot encoding, subword segmentation, etc. but is not limited thereto.

In operation 130 of the method of classifying the data 101 based on the classification system 103 of category of the data 101, the computing device may modify the at least one sentence included in the data 101 using semantic association words of a word for each sentence. In an embodiment of the disclosure, the computing device may perform a filtering process of removing meaningless words existing in the at least one sentence based on the classification system 103 of category of the data 101. In addition, the computing device may extend a word remaining after filtering based on an edit distance in terms of vocabulary and extend the word based on a word embedding model in terms of semantics to perform sentence modification. In an embodiment of the disclosure, the computing device may extend the word remaining after filtering in terms of vocabulary and semantics and then generate a word vector. For example, when the user decides the classification system 103 of category of the data 101 in the functional unit of a product, the computing device may obtain sentences "Galaxy Fold has been supplemented by correcting the front film and the hinge part which had previously been problematic and has a disadvantage that the price is quite burdensome although it is quite complete when used, so it is difficult to become a popular smartphone right now, but it seems to be quite popular with early adopters." as the data 101. The computing device may perform a filtering process of removing meaningless words existing in the sentence and may remain only words such as "Galaxy Fold", "film", "hinge", "smartphone", and "early adapter". In addition, the computing device may extend the words remaining after filtering to morphological and/or semantic words to generate words such as Galaxy Fold, Galaxy, foldable, foldable phone, film, sheet, hinge, smartphone, phone, cellular phone, mobile phone, terminal, early adopter, trend, etc. The computing device may vectorize the generated words to generate word vectors corresponding to the words.

According to an embodiment of the disclosure, the computing device may classify the data 101 according to the user's intention by extracting words necessary for classification of the data 101 based on the keywords in the classification system 103 of category of the data 101, and may enable fine classification and classification according to large scale category by extending the words using techniques such as the edit distance and word embedding, even for short sentences.

In an embodiment of the disclosure, when the computing device does not determine category of the data 101 or does not determine the data 101 as a category wanted by the user based on the classification system 103 of category of the data 101, the computing device may update the classification system 103 of category of the data 101. For example, the computing device may update the classification system 103 of category of the data 101 by outputting a message indicating that a category of the unstructured data 101 may not be determined and receiving a new classification criterion, a keyword, etc. from the user. According to an embodiment of the disclosure, the user may add or modify the classification system 103 of category of the data 101 according to the purpose of use at any time, thereby solving the problem of existing unsupervised learning-based clustering that is classified as an unwanted system and solving the problem of supervised learning-based classification in which the classification accuracy is reduced in the larger category.

In operation 150 of the method of classifying the unstructured data based on the classification system 103 of category of the data 101, the computing device may perform sentence embedding for each category. In an embodiment of the disclosure, the computing device may determine a sentence vector of each sentence using an average weight of the word vectors obtained as a result of performing operation 130. Also, the computing device may smooth the sentence vector using Singular Value Decomposition (SVD) and perform sentence embedding using the smoothed sentence vector.

In operation 170 of the method of classifying the unstructured data based on the classification system 103 of category of the data 101, the computing device may predict a category of a newly received sentence or data. In an embodiment of the disclosure, the computing device may perform sentence embedding on the new sentence or data, and predict the category of the new sentence or data based on a similarity with a centroid for each category. According to an embodiment of the disclosure, when determining the category of the new data, the computing device only needs to determine at least one category by performing sentence embedding on each sentence of the new data, thereby solving the problem of the existing supervised learning-based classification method which required a large amount of training data whenever a new category and new unstructured data are added. In addition, according to an embodiment of the disclosure, the computing device may predict a category of unstructured data based on the centroid for each category, thereby overcoming the complexity and over-fitting problems of a nonlinear method.

Figure 2:
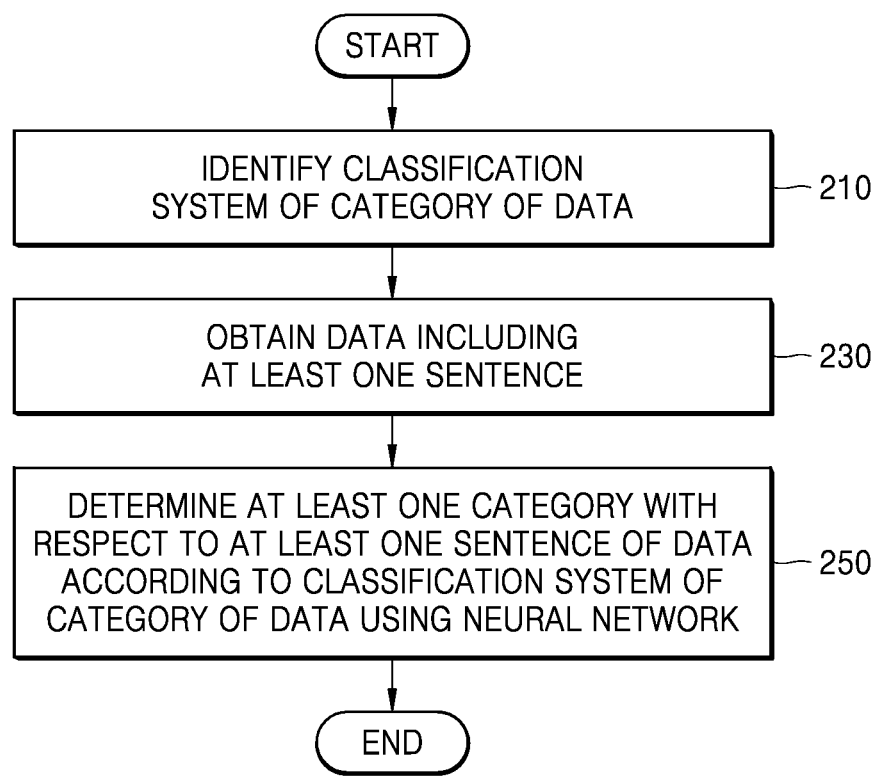
FIG. 2 is a flowchart illustrating an example method of classifying a category of data, according to various embodiments.

FIG. 2 is a flowchart illustrating an example method of classifying a category of data according to various embodiments.

Referring to FIG. 2, in operation 210, a computing device may identify a classification system of category of the data. In an embodiment of the disclosure, the classification system of category of the data may include a classification criterion of category of the data, a plurality of keywords, and classification levels of category of the data, but is not limited thereto. For example, a user of the computing device may set the classification criterion as a function of a product, and input a TV, a radio, a lamp, a bed, a mobile phone, etc. to the plurality of keywords. Accordingly, the computing device may identify the classification system of category of the data including the classification criterion and the plurality of keywords. In addition, the user of the computing device may set the classification levels of category of the data to high, medium, or low. Accordingly, the computing device may identify the classification levels of category of the data, and determine category of the data as at least one of a large category, a medium category, or a small category.

In operation 230, the computing device may obtain data including at least one sentence. In an embodiment of the disclosure, the data may include unstructured data. The unstructured data may refer, for example, to information that does not have a predefined data model or is not organized in a predefined manner. For example, the unstructured data may include social media data, book, magazine, document medical record, audio information, papers, etc. created by a plurality of users, but is not limited thereto.

In operation 250, the computing device may determine at least one category with respect to at least one sentence of the data according to the classification system of category of the data using a neural network. In an embodiment of the disclosure, the computing device may determine the at least one category with respect to at least one sentence of the data obtained in operation 230 based on classification wanted by the user according to the classification system of category of the data identified in operation 210 using the neural network. In an embodiment of the disclosure, the computing device may determine a plurality of category candidates of the data using a first neural network, and determine at least one category among the plurality of category candidates as the at least one category with respect to the at least one sentence of the data using a second neural network. For example, when the data includes social media data created by a plurality of users, and the classification system of category of the data includes a classification system according to product functions, the computing device may obtain requirements of the plurality of users from the social media data using the neural network.

In an embodiment of the disclosure, the computing device may determine that the category of the at least one sentence of the data may not be determined according to the identified classification system of category of the data using the neural network. The computing device may update the classification system of category of the data based on a result of determining that the category of the at least one sentence of the data may not be determined. Also, the computing device may determine the at least one category with respect to at least one sentence of the data according to the updated classification system of category of the data.

In an embodiment of the disclosure, the computing device may determine a plurality of category candidates of the data using the first neural network, and determine at least one category among the plurality of category candidates of the data as the at least one category with respect to the at least one sentence of the data using the second neural network.

In an embodiment of the disclosure, the data may include social media data created by a plurality of users, the classification system of category of the data may include a classification system according to product functions, and the computing device may obtain requirements of the plurality of users based on the determined at least one category.

In an embodiment of the disclosure, the computing device may generate first training data obtained by performing preprocessing and sentence segmentation of the obtained data, based on the first training data, generate second training data including at least one of a morphological similar word or a semantic similar word for each sentence, based on the second training data, generate third training data obtained by performing sentence embedding, and based on the third training data, determine the at least one category with respect to the at least one sentence of the data according to the classification system of category of the data.

In an embodiment of the disclosure, the computing device may generate the first training data by performing sentence segmentation according to sentence boundary recognition based on the obtained data and removing unnecessary terms from the data based on a result of performing sentence segmentation.

In an embodiment of the disclosure, the computing device may generate first modification data in which words excluding words matching the plurality of keywords are removed from the first training data, generate second modification data in which morphological similar words of words of the first modification data extend using an edit distance algorithm, and based on word embedding, generate the second training data including a word vector in which word semantic similar words of words of the second modification data extend, based on the classification system of category of the data.

In an embodiment of the disclosure, the words matching the plurality of keywords may include a word included in the plurality of keywords, a word matching the plurality of keywords using approximate string matching, etc.

In an embodiment of the disclosure, the computing device may generate the third training data as a result of obtaining an average weight with respect to at least one word vector from the second training data, smoothing the obtained average weight using SVD, and performing sentence embedding using the smoothed average weight.

In an embodiment of the disclosure, the average weight of the at least one word vector may be obtained using a weight of the at least one word vector, based on a maximum likelihood estimate, and the weight of the at least one word vector may be a weight calculated with respect to at least one word using Term Frequency-Inverse Document Frequency (TF*IDF).

In an embodiment of the disclosure, the computing device may determine a centroid that is most similar to the third training data among the classification system of category of the data, and determine the at least one category with respect to the least one sentence of the data based on the determined centroid.

Figure 3:
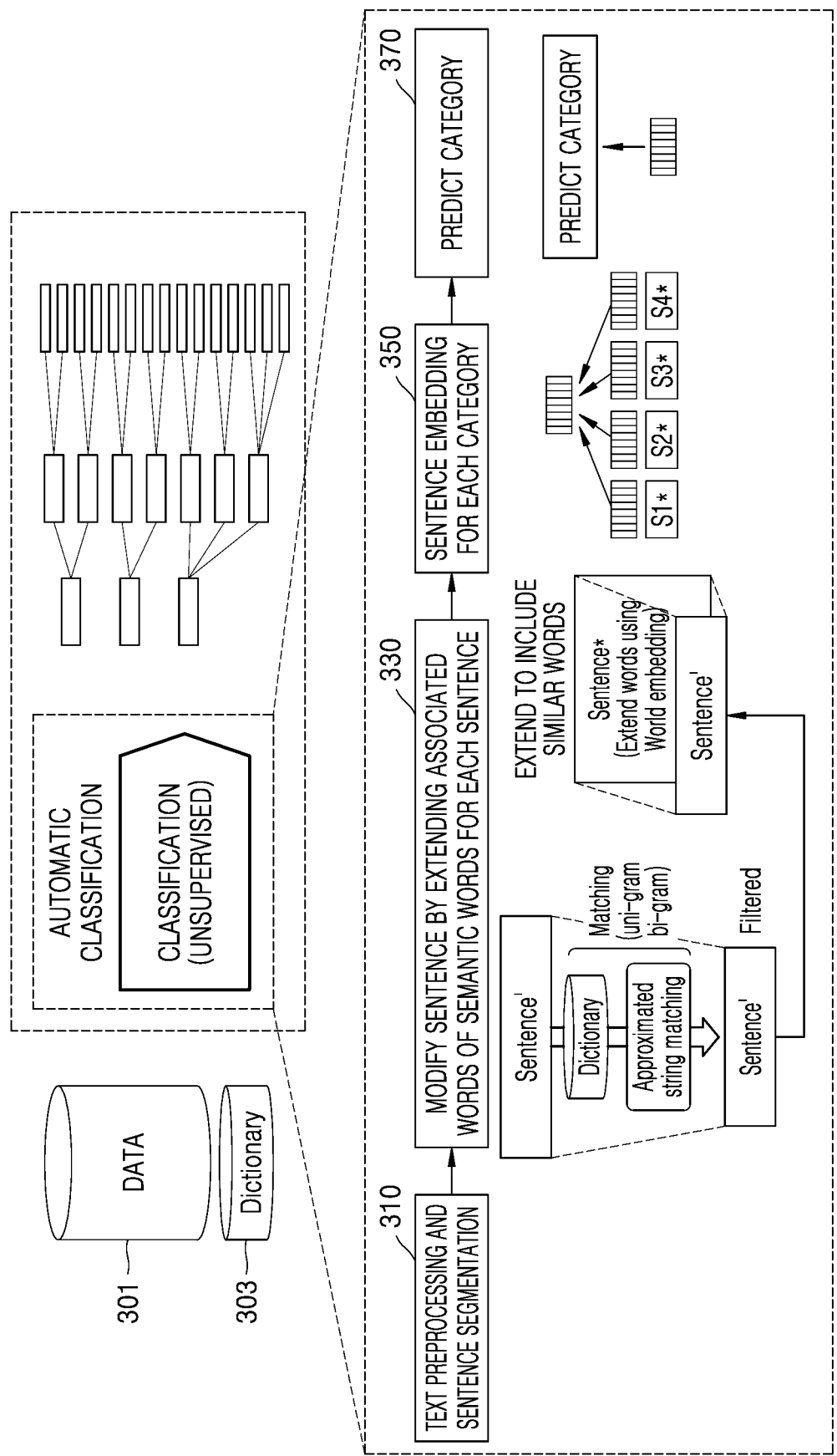
FIG. 3 is a diagram illustrating an example method of classifying data according to unsupervised learning, according to various embodiments.

FIG. 3 is a diagram illustrating an example method of classifying data 301 according to unsupervised learning according to various embodiments.

Referring to FIG. 3, the computing device may determine at least one category of the data 301 using a pre-built dictionary 303. In an embodiment of the disclosure, the pre-built dictionary 303 may include a classification criterion of category of the data 301 and a plurality of keywords, but is not limited thereto. According to an embodiment of the disclosure, the computing device may overcome a limitation on scalability of supervised learning requiring a large amount of correct answer labels by performing classification by unsupervised learning using a small number of keywords. In an embodiment of the disclosure, the pre-built dictionary 303 may correspond to the classification system 103 of category of data 101 described above with reference to FIG. 1.

In operation 310, the computing device may perform a text preprocessing process and a sentence segmentation process. In an embodiment of the disclosure, the text preprocessing process may include a job of preprocessing text suitable for a purpose, and may perform tokenization, cleaning, normalization, stemming, lemmatization, stopword removal, regular expression text preprocessing, integer encoding, one-hot encoding, subword segmentation, etc. but is not limited thereto. In addition, the sentence segmentation process may be a process in which the computing device segments at least one sentence included in the data 301 by recognizing the boundary of the sentence using machine learning.

In operation 330, the computing device may perform sentence modification by extending associated words of semantic words of the sentence for each sentence segmented in operation 310. In an embodiment of the disclosure, the computing device may tokenize the words of each sentence into uni-gram or bi-gram based on the pre-built dictionary 303 for each sentence segmented in operation 310 and filter the tokenized words. According to an embodiment of the disclosure, the computing device may tokenize the words of each sentence into uni-gram or bi-gram such that the context of each sentence may be easily recognized.

For example, the computing device may remove words excluding words included in the pre-built dictionary 303 from the sentence. For another example, the computing device may remove a word that is not included in the words included in the pre-built dictionary 303, words similar to the words included in the pre-built dictionary 303, etc., from the sentence. The words similar to the words included in the pre-built dictionary 303 may include words that are lexically and semantically similar to the words included in the pre-built dictionary 303, etc., but are not limited thereto. In an embodiment of the disclosure, the words similar to the words included in the pre-built dictionary 303 may be determined using an edit distance technique, a word embedding model, an approximate string matching technique, etc. According to an embodiment of the disclosure, the computing device may improve accuracy in classifying unstructured data by not removing not only the words included in the pre-built dictionary 303 but also the words similar to the words included in the pre-built dictionary 303.

In an embodiment of the disclosure, the computing device may generate a modified sentence including words remaining after filtering and the similar words by matching the remaining words with the word embedding model. Operation 330 may be performed according to the following [Table 1].

TABLE 1

| input : all sentences |
|---|
| 1:  for all sentence s where s ∈ S do |
| 2:   cs = { } where cs is converted sentence |
| 3:   for all token $t_{ij}$ in $s_i$ do where $t_{ij}$ is either uni-gram or bi-gram |
| 4:    if dictionary exists |
| 5:     filtering unmatched $t_{ij}$ |
| 6:    if approximate string matching is applied |
| 7:     keeping $at_{ij}$ where $at_{ij}$ is approximately matched $t_{ij}$ |
| 8:    if $t_{ij}$ ∈ wv where wv is word embedding vector |
| 9:     cs+=$t_{ij}$ and top $\tau_n$ where $\tau_n$ is top N ranked nearest terms |
| 10:   end inner for |
| 11:  end outer for |
| output : converted sentences |

In an embodiment of the disclosure, the computing device may generate modified sentences by taking all sentences of the data 301 as inputs. For example, the data 301 may be social media data which is unstructured data having various subjects and forms, but is not limited thereto. The computing device may tokenize each sentence of at least one sentence included in the data 301 using uni-gram or bi-gram. When each tokenized token does not match the pre-built dictionary 303, the computing device may filter a non-matching token. In an embodiment of the disclosure, when the approximate string matching technique is applied, the computing device may not filter and remain not only the keywords included in the pre-built dictionary 303 but also similar tokens approximately matching the keywords included in the pre-built dictionary 303. In addition, the computing device may generate modified sentences cs including N words that are most similar to the remaining tokens by matching the remaining tokens to the word embedding model. For example, the word embedding model may include a word to vector (word2vec) model, a global vectors for word representation (GloVe) model, a customized word embedding model, etc., but is not limited thereto. According to an embodiment of the disclosure, the modified sentence may obtain an extended classification than the pre-built dictionary 303 using the edit distance technique, the word embedding model, etc. For example, when the GloVe model is used as the word embedding model, a result of [Table 2] may be obtained as follows.

TABLE 2

|  | Input | Output | Output Label |
|---|---|---|---|
| Original Approach | be good deal? | Is this a good deal? | Deal |
| Word2vec Expansion | there be/dev/video device, which theory could be tv tuner, but they be usually just front and rear face camera video mode. | There ARE/dev/video devices, which in theory could be TV tuners, but they are usually just for the front and rear facing cameras in video mode. | Tuner, Camera |
| Word2vec Edit distance Expansion | but I also want good array input and output-ideal input: 3 hdmi, 1 component, 1 composite, 1 VGA pc connection, 1 rca audio input, ideal output: Digital audio out, rca audio out, and HDMI ARC. | But I also want a good array of inputs and outputs-IDEAL INPUTS: 3 HDMI, 1 component, 1 composite, 1 VGA for a PC connection, 1 RCA audio input, IDEAL OUTPUTS: Digital audio out, RCA audio out, and HDMI ARC. | HDMI, Parts, Audio |

For example, when a sentence "be good deal?" is input, the computing device may obtain a sentence "Is this a good deal?" as the modified sentence and obtain deal as an output label. For another example, when the computing device uses the extension by the word2vec model, and "there be/dev/ video device, which theory could be tv tuner, but they be usually just front and rear face camera video mode." is input, the computing device may obtain a sentence "There ARE/ dev/video devices, which in theory could be TV tuners, but they are usually just for the front and rear facing cameras in video mode." as the modified sentence and obtain Tuner and Camera as output labels. For another example, when the computing device uses the extension by a Word2vec Edit distance model, and "but I also want good array input and output—ideal input: 3 hdmi, 1 component, 1 composite, 1 VGA pc connection, 1 rca audio input, ideal output: Digital audio out, rca audio out, and HDMI ARC." is input, the computing device may obtain a sentence "But I also want a good array of inputs and outputs—IDEAL INPUTS: 3 HDMI, 1 component, 1 composite, 1 VGA for a PC connection, 1 RCA audio input, IDEAL OUTPUTS: Digital audio out, RCA audio out, and HDMI ARC." as the modified sentence and obtain HDMI, Parts and Audio as output labels.

In operation 350, the computing device may perform sentence embedding for each category. In an embodiment of the disclosure, the computing device may obtain an average weight value for each modified sentence by calculating an average weight of the words of the modified sentence obtained in operation 330. In addition, the computing device may perform smoothing on average weights using SVD and generate sentence vectors of the modified sentences using the smoothed average weights. The computing device may calculate a centroid for each category using the generated sentence vector. In an embodiment of the disclosure, the centroid may be obtained according to [Table 3].

TABLE 3 input: a set of converted sentences S, word embeddings $v_w$: w ∈ V, parameter β, estimated word probabilities p(w):w ∈ V
1: for all sentence s where s ∈ S do
2: $$v_s \leftarrow \frac{1}{s}\sum_{w \in s} \frac{\beta}{\beta + p(w)} v_w$$ where each w is represented by its TF∗IDF value
3: end for
4: Given matrix M where columns are $v_s$:s ∈ S and u is the singular vector of the matrix
5: for sentence s in S do
6:     $v_s \leftarrow v_s - uu^T v_s$
7: end for
8: for all class c where c ∈ C do
9: $$c_i \leftarrow \frac{\sum_{i=1}^{m} v_{s_i \in c}}{m}$$
10: end for
output: centroid of the set of sentence embeddings per class $[c_i]_{i=1}^{k}$ In an embodiment of the disclosure, the computing device may obtain the centroid with respect to each category as a result of performing sentence embedding by taking the modified sentences obtained as a result of performing operation 330, a word vector of a word w present in the vocabulary of the entire document group, a parameter β, a probability p(w) of a bigram word in the entire document group, etc. as inputs. The computing device may determine a sentence vector $V_s$ using a maximum likelihood estimate with respect to each of the modified sentences. That is, the computing device may obtain the sentence vector $V_s$ by finding the most probable parameter with respect to a vector representing a core subject of a sentence. In this case, a word vector $V_w$ required to calculate the sentence vector $V_s$ may be a weight value calculated by a TF∗IDF formula. In an embodiment of the disclosure, TF*IDF is a weight value of a word obtained by multiplying a term frequency by an inverse document frequency and may be calculated by [Equation 1] as follows:

$$TF*IDF = tf(t,d)*idf(t,D) = \left(0.5 + \frac{0.5 \times f(t,d)}{\max\{f(t,d):w \in d\}}\right)*\left(\log\frac{|D|}{|\{d \in D:t \in d\}|}\right)$$

[Equation 1]

Here, f(t,d) denotes the total frequency of a word t in a document d.

A dot product value between the vector representing the core subject of a sentence and the word vector may represent the correlation between the vector representing the core subject of the sentence and the word vector. Accordingly, the maximum likelihood estimate may refer, for example, to an average value of weights of word vectors of each sentence. According to an embodiment of the disclosure, the computing device may set a lower weight for words that frequently appear using the maximum likelihood estimate, and accordingly, reduce the importance of general words and increase weights of words matching the plurality of keywords. That is, the computing device may improve accuracy for determining the category of the data 301 by increasing weights of words necessary to determine the category of the data 301 other than a general word. The computing device may estimate the direction of a vector representing the core subject of the sentence by calculating a first principal component of the vector representing the core subject of the sentence for each sentence in order to estimate the vector representing the core subject of the sentence. That is, the computing device may determine the sentence vector $V_s$ by subtracting the initial principal component of the vector from a projection of the vector representing the core subject of the sentence and perform sentence embedding. Accordingly, the computing device may determine a centroid of a corresponding category from all sentences belonging to an i-th category $C_i$, based on a sentence embedding result.

In operation 370, the computing device may predict a category such as an input sentence or input data. In an embodiment of the disclosure, the computing device may perform operations 310, 330, and 350 to generate the sentence embedding result, and then determine which centroid is most similar to the input sentence or the input data. Also, the computing device may determine a category corresponding to the most similar centroid as a prediction category based on the most similar centroid. In an embodiment of the disclosure, the computing device may perform batch prediction that performs repetitive prediction for prediction of a more accurate category. In addition, the computing device may determine a predicted category and category candidates for each sentence of the input data. For example, the predicted category and the category candidates according to the input sentences may be as shown in [Table 4].

TABLE 4

| Sentence | Label | Label Candidate |
|---|---|---|
| no means crystals glass covering touching fingers really screwing glare screen, see rate investment. protect plasma daughter annoying glare, possibly little disagrees | Glare, PDP | Flash Lighting Blur Glare Slim Panel Discoloration |

TABLE 4-continued

| Sentence | Label | Label Candidate |
|---|---|---|
| | | Clouding Burn In Repair Overheat Flashlighting Clouding LED Rebooting |

In an embodiment of the disclosure, operations 310, 330, and 350 may be operations for training a neural network, and operation 370 may be a utilization operation of determining the category using an artificial intelligence model that predicts the category of the input data using the trained neural network.

Figure 4:
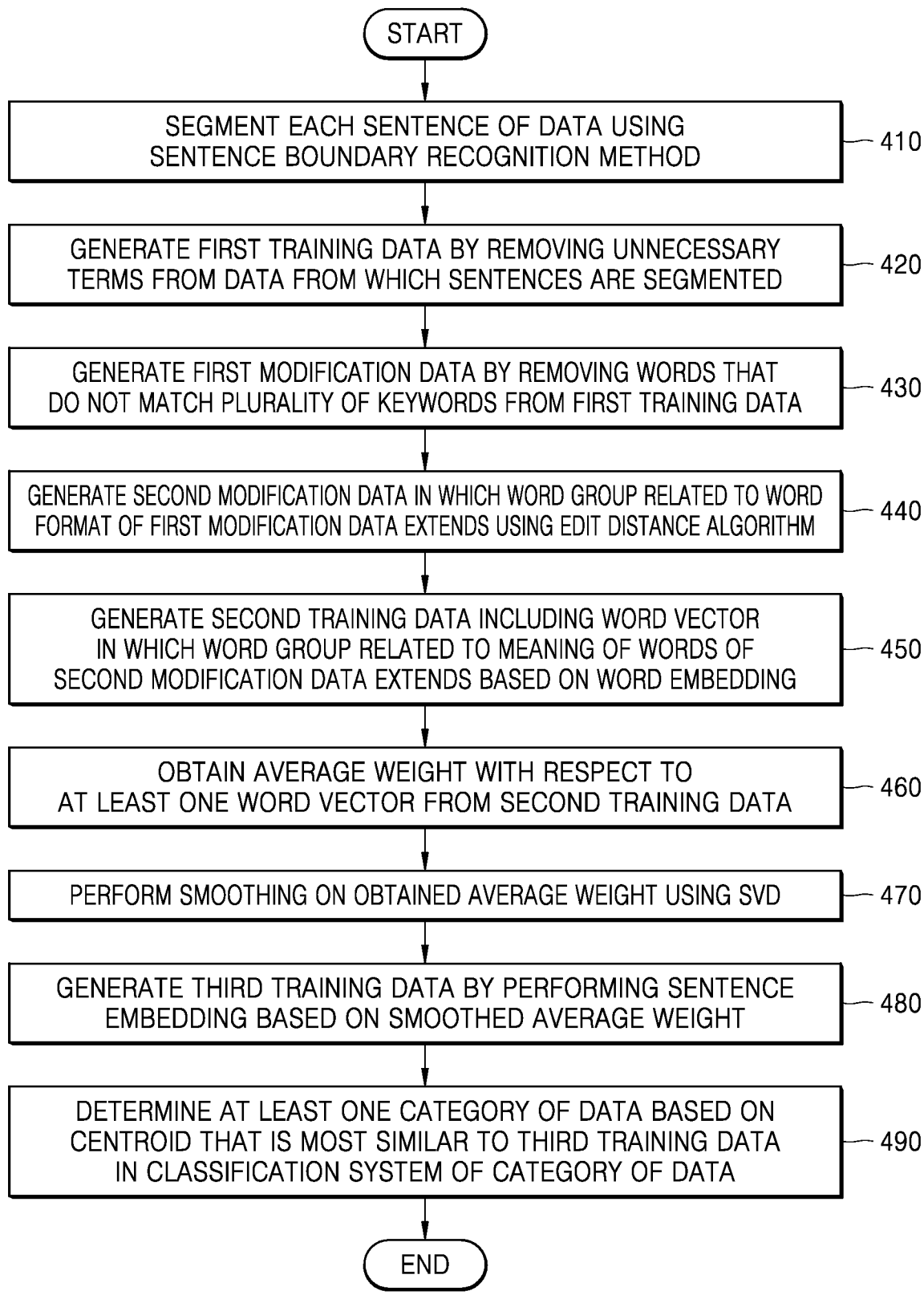
FIG. 4 is a flowchart illustrating an example method of determining at least one category of data, according to various embodiments.

FIG. 4 is a flowchart illustrating an example method of determining at least one category of data according to various embodiments.

Referring to FIG. 4, in operation 410, a computing device may segment each sentence of the data using a sentence boundary recognition method. In an embodiment of the disclosure, the computing device may segment each sentence by receiving the data as input and dividing text included in the data in units of sentences.

In operation 420, the computing device may generate first training data by removing unnecessary terms from the data from which sentences are segmented. For example, unnecessary terms may include stopwords that do not have a meaningful meaning. Accordingly, the computing device may generate the first training data from which stopwords of the data are removed.

In operation 430, the computing device may generate first modification data by removing words that do not match a plurality of keywords from the first training data. In an embodiment of the disclosure, the plurality of keywords may be predefined by a computing user. The computing device may perform a filtering process of removing words excluding words corresponding to the plurality of keywords or similar to the plurality of keywords. For example, the words similar to the plurality of keywords may include words that are morphologically or semantically similar to the plurality of keywords.

In operation 440, the computing device may generate second modification data in which a word group related to a word format of the first modification data extends using an edit distance algorithm. In an embodiment of the disclosure, the edit distance algorithm is an algorithm of determining the similarity of two character strings, and the computing device may obtain the second modification data in which a morphologically similar word group of the first modification data extends using the edit distance algorithm.

In operation 450, the computing device may generate second training data including a word vector in which a word group related to the meaning of words of the second modification data extends based on word embedding. In an embodiment of the disclosure, word embedding represents words in the form of a multidimensional vector in which each dimension has a real value in a multidimensional vector space, and the computing device may generate the second training data in which a semantically similar word group of the second modification data extends based on word embedding.

In operation 460, the computing device may obtain an average weight with respect to at least one word vector from the second training data. In an embodiment of the disclosure, the computing device may calculate a weight value calculated by the TF*IDF formula with respect to the at least one word vector of the second training data, and based on the calculated weight value, obtain the average weight with respect to the at least one word vector.

In operation 470, the computing device may perform smoothing on the obtained average weight using SVD. According to an embodiment of the disclosure, the computing device may smooth the obtained average weight by reducing a dimension of a matrix using SVD. For example, the computing device may improve its performance for determining category of the data by reducing the importance of words corresponding to general words without representing data characteristics using the maximum likelihood estimate.

In operation 480, the computing device may generate third training data by performing sentence embedding based on the smoothed average weight. In an embodiment of the disclosure, as a result of performing sentence embedding, the computing device may obtain a centroid corresponding to the plurality of keywords from the third training data. For example, as a result of performing sentence embedding on a plurality of sentences including a sentence about a TV, a sentence about a drama, a sentence about image quality, etc., the computing device may obtain a centroid corresponding to the TV. For another example, as a result of performing sentence embedding on a plurality of sentences including a sentence about a mobile phone, a sentence about the performance of a tablet PC, a sentence about a voice assistant, etc., the computing device may obtain a centroid corresponding to a terminal.

In operation 490, the computing device may determine at least one category of the data based on a centroid that is the most similar to the third training data in the classification system of category of the data. For example, when the data includes a sentence "It would be good when the call quality of wireless earphones is improved", the computing device may perform sentence embedding based on the third training data, and then determine 'Bluetooth earphones' which is the most similar centroid as the category of the data. Alternatively, the computing device may determine 'call quality' as the category of the data along with 'Bluetooth earphones'. According to an embodiment of the disclosure, the user of the computing device may understand requirements of consumers by understanding terms of the consumers in units of function of a product.

Figure 5:
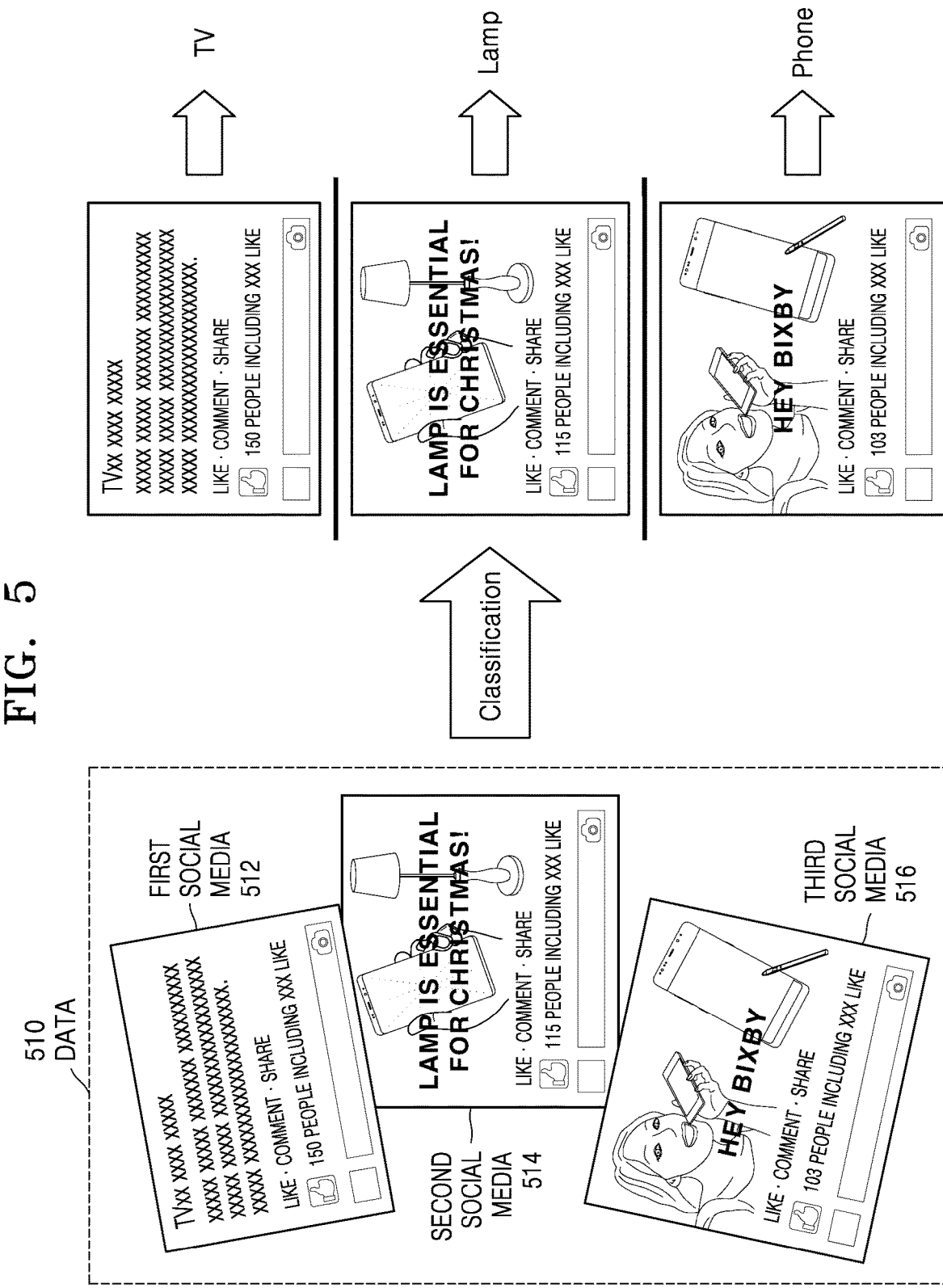
FIG. 5 is a diagram illustrating an example method of classifying social media data in units of functions of a product, according to various embodiments.

FIG. 5 is a diagram illustrating an example method of classifying social media data 512, 514, and 516 in units of function of a product according to various embodiments.

Referring to FIG. 5, a computing device may classify data 510 including the social media data 512, 514, and 516 in units of functions of the product. In an embodiment of the disclosure, the computing device may identify a classification system of category of the data 510 including a classification criterion of category of the data 510 and a plurality of keywords. The classification system of category of the data 510 may include a classification system according to the function of the product. Accordingly, the classification system of category of the data 510 may be the function of the product, and the plurality of keywords may include a TV, a radio, a lighting, a mobile phone, a speaker, etc.

In an embodiment of the disclosure, the computing device may obtain the data 510 including at least one sentence. For example, the computing device may obtain the data 510 including the first social media data 512, the second social media data 514, the third social media data 516, etc.

In an embodiment of the disclosure, the computing device may determine at least one category with respect to the at least one sentence of the data 510 based on the identified classification system of category of the data 510 using a neural network that performs classification by unsupervised learning. For example, the computing device may analyze at least one sentence included in the first social media data 512 and determine a category of the first social media data 512 as the TV. For another example, the computing device may obtain a sentence "Lamp is essential for Christmas!" included in the second social media data 514, identify words 'Christmas' and 'lamp' from the sentence, and determine the category of the second social media data 514 as Lamp instead of an anniversary based on a classification system according to the function of the product. In a case of clustering using unsupervised learning, the computing device may the category of the second social media data 514 as the 'anniversary', but an operating method of the computing device according to an embodiment of the disclosure may determine the category of the second social media data 514 as Lamp included in the classification system wanted by a computing user by determining the category of the second social media data 514 based on the identified classification system of category of the data 510. For another example, the computing device may determine the category of the third social media data 516 as Phone.

Figure 6:
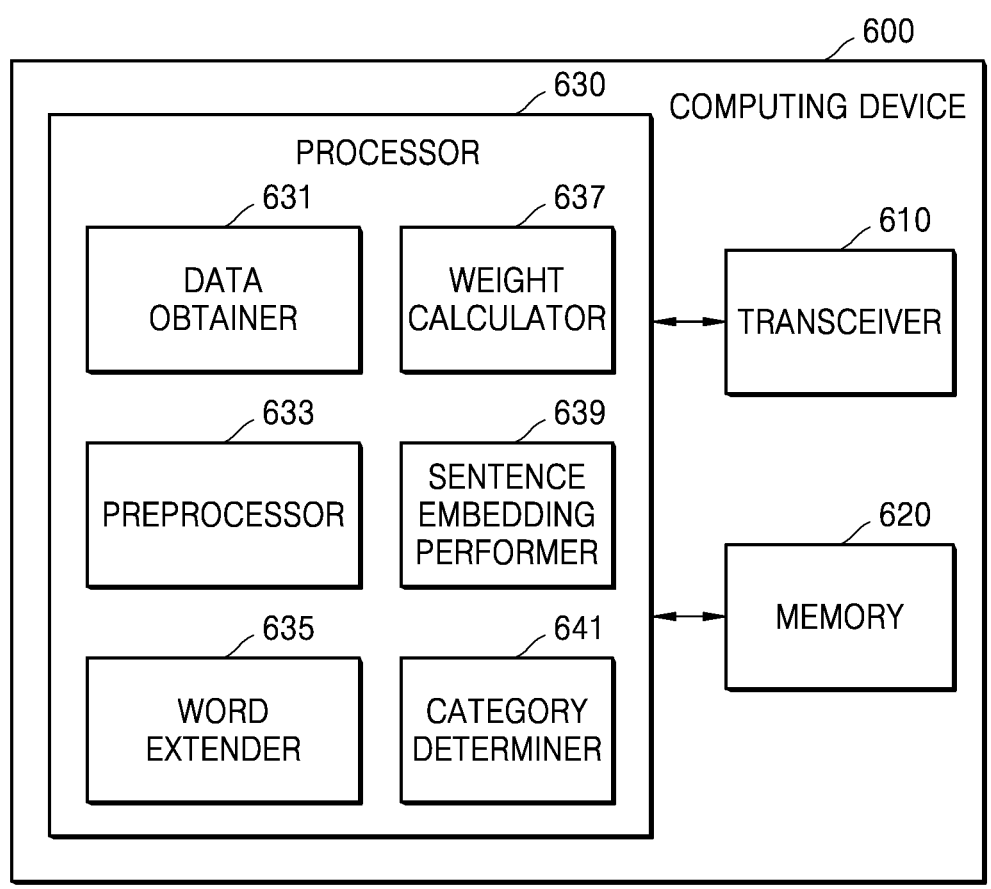
FIG. 6 is a block diagram illustrating an example configuration of a computing device, according to various embodiments.

FIG. 6 is a block diagram illustrating an example configuration of a computing device 600 according to various embodiments.

Referring to FIG. 6, the computing device 600 may include a transceiver 610, a memory 620, and a processor (e.g., including processing circuitry) 630. In addition, the processor 630 may include a data obtainer (e.g., including various processing circuitry and/or executable program elements) 631, a preprocessor (e.g., including various processing circuitry and/or executable program elements) 633, a word extender (e.g., including various processing circuitry and/or executable program elements) 635, a weight calculator (e.g., including various processing circuitry and/or executable program elements) 637, a sentence embedding performer (e.g., including various processing circuitry and/or executable program elements) 639, and a category determiner (e.g., including various processing circuitry and/or executable program elements) 641. However, not all of the components shown in FIG. 6 are indispensable components of the computing device 600. The computing device 600 may be implemented by more components than the components shown in FIG. 6, or the computing device 600 may be implemented by fewer components than the components shown in FIG. 6. In addition, the transceiver 610, the memory 620, and the processor 630 may be implemented in the form of a single chip.

The processor 630 may include various processing circuitry, including, for example, one processor or a plurality of processors. In this case, one processor or the plurality of processors may be a general-purpose processor such as a CPU, AP, or Digital Signal Processor (DSP), a graphics-only processor such as a GPU, a Vision Processing Unit (VPU), or an artificial intelligence-only processor such as an NPU. Alternatively, when one processor or the plurality of processors are dedicated artificial intelligence processors, the artificial intelligence dedicated processor may be designed with a hardware structure specialized for processing a specific artificial intelligence model.

The processor 630 may control processing input data according to a predefined operation rule or an artificial intelligence model stored in the memory 620. The predefined operation rule or the artificial intelligence model may be created through training. Here, creating through training may refer, for example, to the basic artificial intelligence model being trained by a learning algorithm using a plurality of training data such that the predefined operation rule or the artificial intelligence model set to perform a wanted characteristic (or purpose) is created. Such training may be performed in the computing device 600 itself on which artificial intelligence according to the disclosure is performed, or may be performed through a separate server and/or system. The artificial intelligence model may include a plurality of neural network layers. Each of the plurality of neural network layers has a plurality of weight values and performs a neural network operation through an operation between an operation result of a previous layer and a plurality of weights. The plurality of weights of the plurality of neural network layers may be optimized by a training result of the artificial intelligence model. For example, the plurality of weights may be updated to reduce or minimize a loss value or a cost value obtained from the artificial intelligence model during a training process. The artificial neural network may include a deep neural network (DNN), for example, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), or deep Q-Networks, and the like, but is not limited to the above-described example.

In an embodiment of the disclosure, the data obtainer 631 may include various processing circuitry and/or executable program elements and obtain data including a classification criterion of category of data, a classification level of category of data, a plurality of keywords, at least one sentence, etc., but the data that the data obtainer 631 may obtain is not limited thereto.

In an embodiment of the disclosure, the preprocessor 633 may include various processing circuitry and/or executable program elements and receive the data including the at least one sentence from the data obtainer 631 and perform a preprocessing process using the received data. For example, the preprocessing process may include a tokenization process, a cleaning process, a normalization process, a stemming process, a lemmatization process, a stopword removal process, a regular expression text preprocessing process, an integer encoding process, a one-hot encoding process, a subword segmentation process, etc.

In an embodiment of the disclosure, the word extender 635 may include various processing circuitry and/or executable program elements and receive the data on which the preprocessing process is performed from the preprocessor 633 and extend a word based on words included in the received data. For example, the word extender 635 may extend the word to words morphologically similar to words included in the data using an edit distance algorithm and extend the word to words semantically similar to the words included in the data using word embedding. Alternatively, the word expansion unit 635 may extend the word to the morphologically and semantically similar words.

In an embodiment of the disclosure, the weight calculator 637 may include various processing circuitry and/or executable program elements and receive the extended words from the word extender 635 and calculate a weight of each word. For example, the weight calculator 637 may calculate the weight of each extended word using the TF*IDF formula.

In an embodiment of the disclosure, the sentence embedding performer 639 may include various processing circuitry and/or executable program elements and receive the weight of each word from the weight calculator 637 to calculate an average weight and obtain a sentence vector based on the average weight. Also, the sentence embedding performer 639 may perform sentence embedding based on the sentence vector.

In an embodiment of the disclosure, the category determiner 641 may include various processing circuitry and/or executable program elements and receive a sentence embedding result from the sentence embedding performer 639 and determine a category of input data of which category the computing device 600 is to determine. For example, as a result of performing sentence embedding on the input data, the category determiner 641 may determine a category of the input data as a category having the most similar centroid.

Figure 7:
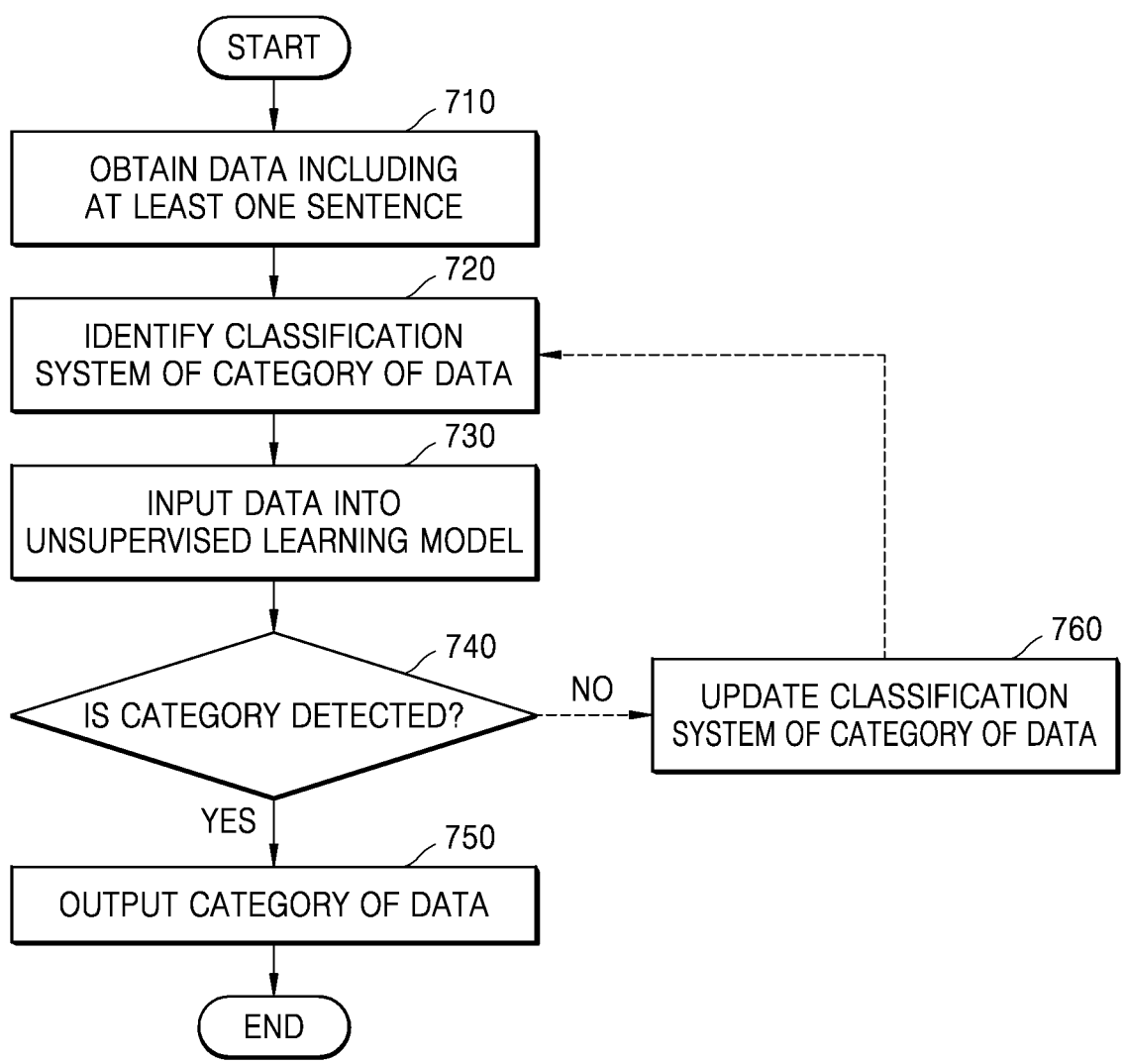
FIG. 7 is a flowchart illustrating an example method of updating a classification system of a category of data, according to various embodiments.

FIG. 7 is a flowchart illustrating an example method of updating a classification system of category of data according to various embodiments.

Referring to FIG. 7, in operation 710, a computing device may obtain data including at least one sentence. In an embodiment of the disclosure, the data including the at least one sentence is data is not structured and may include unstructured data that does not have a predefined data model. For example, the unstructured data may include social media data including abbreviations, slang, new words, etc.

In operation 720, the computing device may identify the classification system of category of data. In an embodiment of the disclosure, the classification system of category of data may include a classification system that a user of the computing device wants to classify the data, and may include a classification criterion of category of data, a plurality of keywords, etc., but is not limited thereto and may further include a classification level of category of data as a degree of detail of classification wanted by the user. According to an embodiment of the disclosure, the computing device may solve a disadvantage of supervised learning that is not classified into the classification system wanted by the user of the computing device by previously identifying the classification system of category of data.

In operation 730, the computing device may input data including the identified classification system of category of data and the obtained at least one sentence into an unsupervised learning-based model. According to an embodiment of the disclosure, the computing device may improve the accuracy or scalability thereof using the unsupervised learning-based model, compared to a supervised learning-based model that is trained based on a label, that is, a category corresponding to a correct answer, together with input data.

In operation 740, the computing device may determine whether the category of data is detected as an output of the unsupervised learning model. In an embodiment of the disclosure, when the category of data is detected based on the classification system of category of data ("Yes" in operation 740), the computing device may perform operation 750, and when the category of data is not detected or the category of data is detected differently from the classification system of category of data ("No" in operation 740), the computing device may perform operation 760.

In operation 750, as a result of determining that the category is detected, the computing device may output the category of data. In an embodiment of the disclosure, the computing device may determine at least one category of data based on the classification system of category of data.

In operation 760, as a result of determining that the category is not detected, the computing device may update the classification system of category of data. In an embodiment of the disclosure, when the category is not detected or a category different from the classification system of category of data is detected, the computing device may receive a classification criterion of category of data, a keyword, etc. from the user to update the classification system of category of data. According to an embodiment of the disclosure, when the detected category of data is not the category intended by the user, the computing device may more easily perform subject analysis than automatically performing clustering by updating the classification system of category of data and solve a problem in which the larger the category, the less accurate the classification, which is the problem of classification by supervised learning The computing device may perform operations 720 to 750 again after updating the classification system of category of data.

Figure 8:
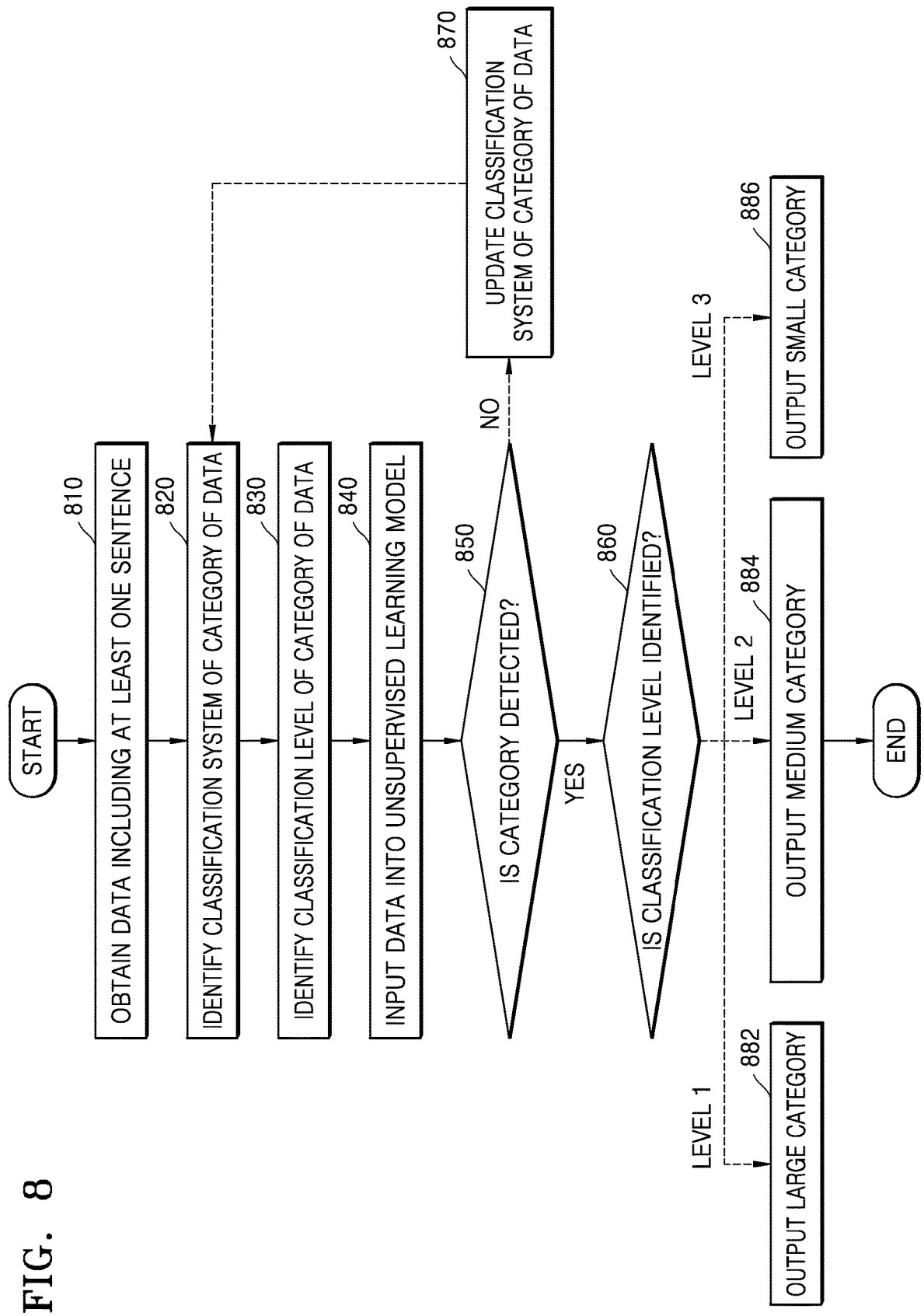
FIG. 8 is a flowchart illustrating an example method of determining a category of data according to a classification level, according to various embodiments.

FIG. 8 is a flowchart illustrating an example method of determining a category of data according to a classification level according to various embodiments.

Referring to FIG. 8, in operation 810, a computing device may obtain data including at least one sentence. In an embodiment of the disclosure, operation 810 may correspond to operation 710 described above with reference to FIG. 7.

In operation 820, the computing device may identify a classification system of category of data. In an embodiment of the disclosure, the classification system of category of data is a classification system that a user of the computing device wants to classify the data, and may include a classification criterion of the category of data, a plurality of keywords, etc., In operation 830, the computing device may identify a classification level of the category of data. In an embodiment of the disclosure, the computing device may identify the classification level of the category of data according to the degree of detail of the classification desired by the user. For example, when the user wants a detailed classification, the computing device may identify the classification level of the category of data as level 5, and when the user wants a rough classification, the computing device may identify the classification level of the category of data as level 1.

In operation 840, the computing device may input the data obtained in operation 810, the classification system of category of data identified in operation 820, and the classification level of the category of data identified in operation 840 into an unsupervised learning model.

In operation 850, the computing device may determine whether a category of data including at least one sentence is detected. In an embodiment of the disclosure, operation 850 may correspond to operation 740 described above with reference to FIG. 7.

In operation 860, as a result of determining that the category of data is detected ("Yes" in operation 850), the computing device may identify the classification level of the category of data. In an embodiment of the disclosure, the computing device may determine the category of data according to the identified classification level.

In operations 882, 884, and 886, the computing device may output a large category, a medium category, a small category, etc. according to the classification level of the category of data. For example, the computing device may output the large category as a result of identifying the classification level of the category of data as level 1. For another example, the computing device may output the medium category as a result of identifying the classification level of the category of data as level 2, and output the small category as a result of identifying the classification level of the category of data as level 3. However, this is only an example, and the computing device may output all or only some of the large category, the medium category, and the small category.

In operation 870, as a result of determining that the category of data is not detected ("No" in operation 850), the computing device may update the classification system of category of data. In an embodiment of the disclosure, operation 870 may correspond to operation 760 described above with reference to FIG. 7.

Figure 9:
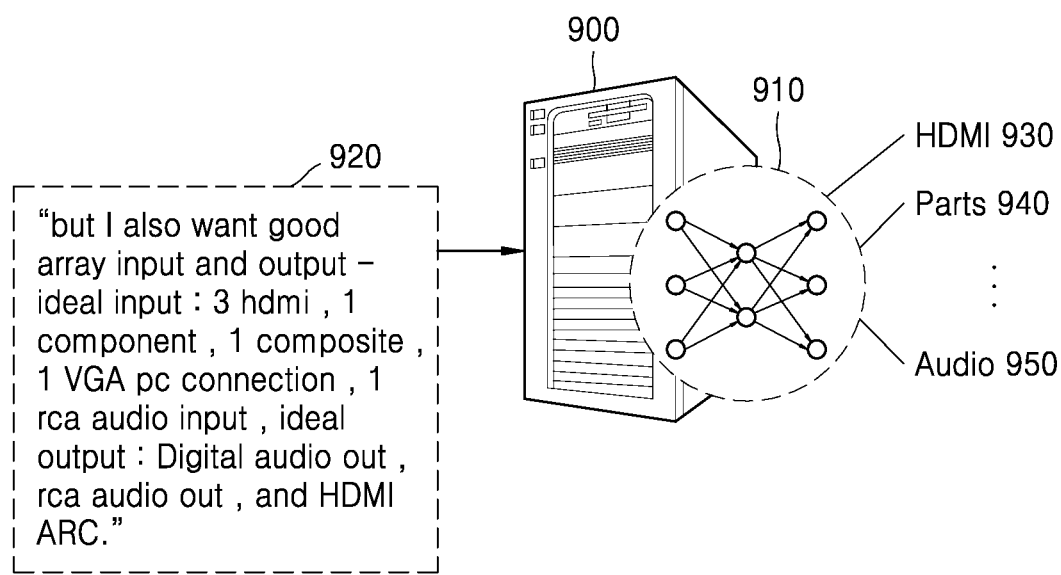
FIG. 9 is a diagram illustrating an example method, performed by a server, of determining a plurality of a category of data, according to various embodiments.

FIG. 9 is a diagram illustrating an example method, performed by a server 900, of determining a plurality of a category of data 920 according to various embodiments.

Referring to FIG. 9, a computing device may obtain the data 920 including at least one sentence. In addition, the computing device may obtain a classification system of the category of the data 920 including classification criteria of the category of the data 920 and a plurality of keywords. The computing device may transmit the data 920 and the classification system of the category of the data 920 to the server 900 including a neural network 910. The server 900 may determine at least one category with respect to the at least one sentence of the data 920 based on the data 920 and the classification system of the category of the data 920 received from the computing device.

In an embodiment of the disclosure, the server 900 may generate first training data by performing a preprocessing process and a sentence segmentation process on the at least one sentence included in the data 920. In addition, the server 900 may generate second training data in which a semantic association group of words extends for each sentence based on the first training data. The server 900 may generate third training data obtained by performing sentence embedding based on the second training data, and may determine the at least one category according to the classification system of the a category of the data 920 based on the third training data. For example, the server 900 may obtain social media data "but I also want good array input and output—ideal input: 3 hdmi, 1 component, 1 composite, 1 VGA pc connection, 1 rca audio input, ideal output: Digital audio out, rca audio out, and HDMI ARC." to determine a first category 930 corresponding to HDMI, a second category 940 corresponding to Parts, and a third category 950 corresponding to Audio, etc. In addition, the server 900 may determine a final category including at least one category from among a plurality of a category including the first category 930, the second category 940, and the third category 950.

Figure 10:
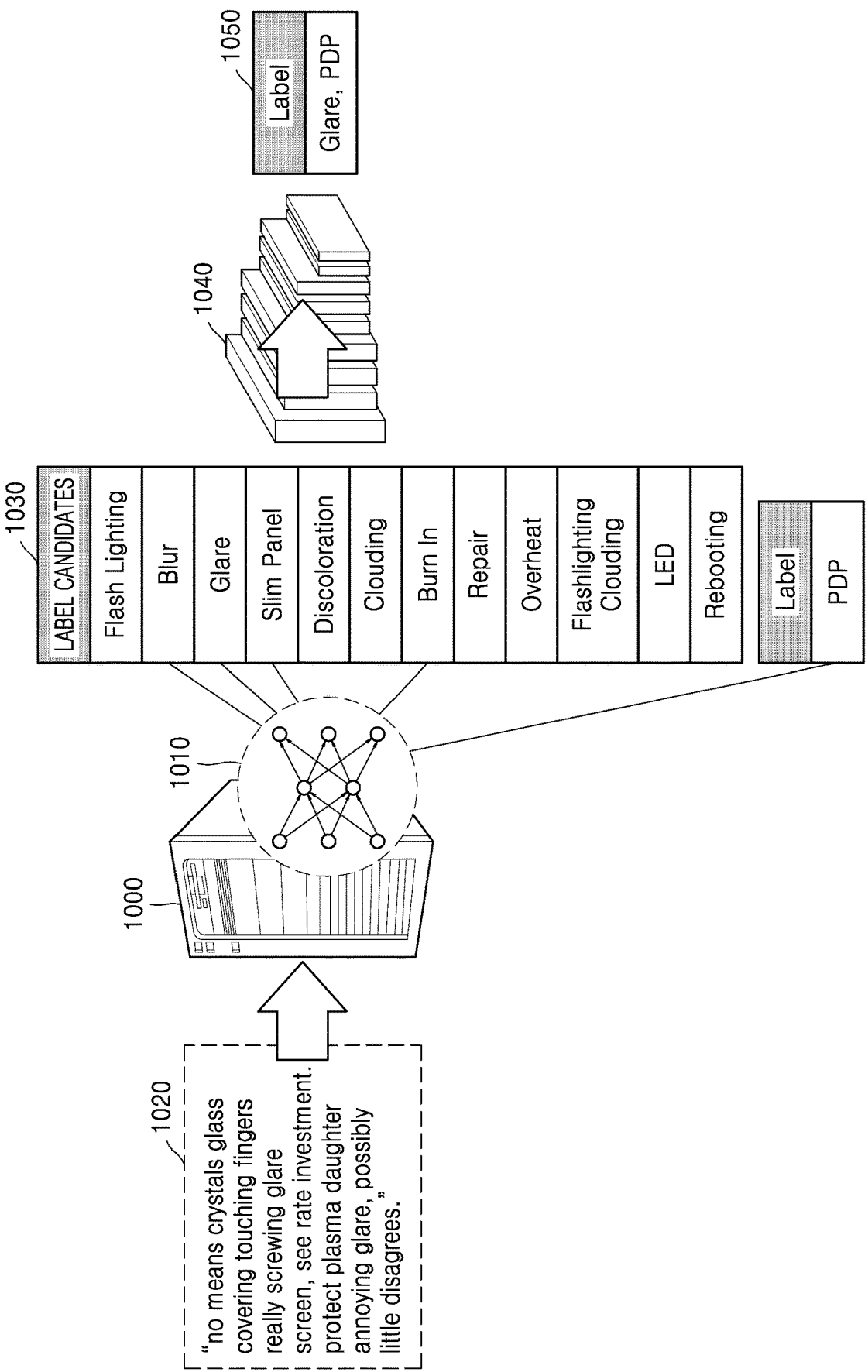
FIG. 10 is a diagram illustrating an example method of determining a plurality of category candidates of unstructured data using a first neural network and determining a final category using a second neural network, according to various embodiments.

FIG. 10 is a diagram illustrating an example method of determining a plurality of category candidates of unstructured data using a first neural network 1010 and determining a final category 1050 using a second neural network 1040 according to various embodiments.

Referring to FIG. 10, a computing device 1000 may obtain data 1020 including at least one sentence. In an embodiment of the disclosure, the computing device 1000 may include the first neural network 1010. The first neural network 1010 may be a neural network that performs classification by unsupervised learning. Accordingly, the computing device 1000 may determine at least one category of the data 1020 using the first neural network 1010. For example, the computing device 1000 may use the first neural network 1010 to determine Blur, Glare, Slim Panel, Burn In, etc. among Label candidates 1030 as a category candidate of the data 1020, and determine a plasma display panel (PDP) that is not included in the Label candidates 1030 as a category candidate of the data 1020. According to an embodiment of the disclosure, the computing device 1000 may update a classification system of category of the data 1020 including a classification criterion of the category of the data 1020 and a plurality of keywords based on determination that the PDP that is not included in the Label candidates 1030 is determined as the category candidate of the data 1020, i.e., when a user of the computing device 1000 wants to obtain the PDP as the category of the data 1020.

In an embodiment of the disclosure, the computing device 1000 may determine the final category 1050 using the second neural network 1040 among the plurality of category candidates obtained using the first neural network 1010. For example, the computing device 1000 may obtain Glare and PDP among the plurality of category candidates including Blur, Glare, Slim Panel, Burn In, PDP, etc. as the final category 1050 using the second neural network 1040. According to an embodiment of the disclosure, the computing device 1000 may classify the data 1020 based on a category wanted by the user by adding or correcting the classification system of the category of the data 1020.

In an embodiment of the disclosure, the computing device 1000 may determine at least one category with respect to at least one sentence of the data 1020 using batch prediction. According to an embodiment of the disclosure, the computing device 1000 may predict at least one more accurate category using batch prediction that performs repetitive prediction.

Figure 11:
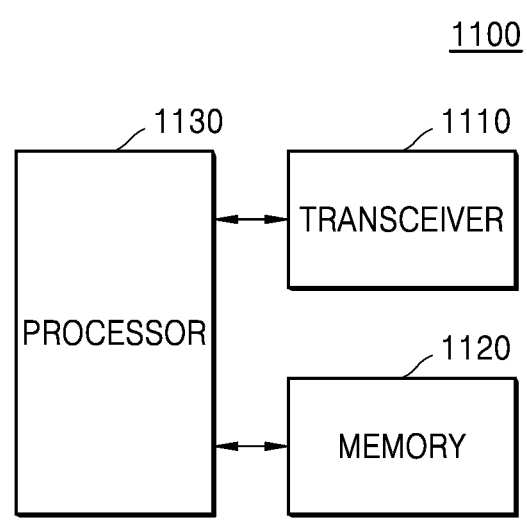
FIG. 11 is a block diagram illustrating an example configuration of a computing device according to various embodiments.

FIG. 11 is a block diagram illustrating an example configuration of a computing device 1100 according to various embodiments.

Referring to FIG. 11, the computing device 1100 may include a transceiver 1110, a memory 1120, and a processor (e.g., including processing circuitry) 1130. However, not all of the components shown in FIG. 11 are indispensable components of the computing device 1100. The computing device 1100 may be implemented by more components than the components shown in FIG. 11, and the computing device 1100 may be implemented by fewer components than the components shown in FIG. 11. In addition, the transceiver 1110, the processor 1130, and the memory 1120 may be implemented in the form of a single chip.

In an embodiment of the disclosure, the transceiver 1110 may communicate with an electronic device connected to the computing device 1100 by wired or wirelessly. For example, the transceiver 1110 may receive data from a server as input, and may receive a list of a plurality of a category of data from the server.

Various types of data such as programs such as applications and files may be installed and stored in the memory 1120. The processor 1130 may include various processing circuitry and access and use the data stored in the memory 1120 or may store new data in the memory 1120. In an embodiment of the disclosure, the memory 1120 may include a database. In addition, the memory 1120 may store a predefined operation rule or an artificial intelligence model used in the computing device 1100. In an embodiment of the disclosure, the memory 1120 may store a classification system of category of data, a pre-built dictionary, etc. The memory 1120 may include a storage medium such as a ROM, a RAM, a hard disk, a CD-ROM, a DVD, or a combination of storage media. Also, the memory 1120 does not exist separately and may be included in the processor 1130.

The processor 1130 may include various processing circuitry including, for example, one processor or a plurality of processors. In this case, one processor or the plurality of processors may be a general-purpose processor such as a CPU, AP, or Digital Signal Processor (DSP), a graphics-only processor such as a GPU, a Vision Processing Unit (VPU), or an artificial intelligence-only processor such as an NPU. Alternatively, when one processor or the plurality of processors are dedicated artificial intelligence processors, the artificial intelligence dedicated processor may be designed with a hardware structure specialized for processing a specific artificial intelligence model.

Also, the processor 1130 may control a series of processes such that the computing device 1100 may operate according to the above-described embodiment of the disclosure. The processor 1130 may control to process input data according to a predefined operation rule or an artificial intelligence model stored in the memory 1120. The predefined operation rule or the artificial intelligence model may be created through training. Here, creating through training may refer, for example, to the basic artificial intelligence model being trained by a learning algorithm using a plurality of training data such that the predefined operation rule or the artificial intelligence model set to perform a wanted characteristic (or purpose) is created. Such training may be performed in the computing device 1100 itself on which artificial intelligence according to the disclosure is performed, or may be performed through a separate server and/or system. Examples of the learning algorithm include supervised learning, unsupervised learning, semi-supervised learning, or reinforcement learning, but are not limited to the above-described examples. The artificial intelligence model may include a plurality of neural network layers. Each of the plurality of neural network layers has a plurality of weight values and performs a neural network operation through an operation between an operation result of a previous layer and a plurality of weights. The plurality of weights of the plurality of neural network layers may be optimized by a training result of the artificial intelligence model. For example, the plurality of weights may be updated to reduce or minimize a loss value or a cost value obtained from the artificial intelligence model during a training process. The artificial neural network may include a deep neural network (DNN), for example, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), or deep Q-Networks, and the like, but is not limited to the above-described example.

In an embodiment of the disclosure, the processor 1130 may perform an operation for operating the computing device 1100 by executing the program stored in the memory 1120. For example, the processor 1130 may identify a classification system of the category of data including a classification criterion of the category of data and a plurality of keywords, obtain unstructured data including at least one sentence, and using a neural network, determine at least one category with respect to the at least one sentence of the unstructured data according to the classification system of the category of data.

Some embodiments may be embodied in a non-transitory computer-readable recording medium including instructions executable by a computer such as a program module executed by the computer. A computer-readable medium may be any usable medium which may be accessed by the computer and includes all volatile/non-volatile and removable/non-removable media. Further, the computer-readable medium may include a computer storage medium. The computer storage medium includes all volatile/non-volatile and removable/non-removable media embodied by a certain method or technology for storing information such as computer-readable instructions, a data structure, a program module or other data.

The various example embodiments of the disclosure may be implemented as an software program including instructions stored in a non-transitory computer-readable storage media.

The computer, as a device capable of calling stored instructions from a storage medium and performing operations according to embodiments of the disclosure according to the called instructions, may include an electronic device according to embodiments of the disclosure.

The computer-readable storage medium may be provided as a non-transitory storage medium. Here, the 'non-transitory' storage medium may not include a signal or current and is tangible, but does not distinguish whether data is stored semi-permanently or temporarily in the storage medium.

In addition, the control method according to disclosed embodiments of the disclosure may be provided as a computer program product. The computer program product may include a product traded between a seller and a purchaser.

The computer program product may include a software (S/W) program and a computer-readable storage medium with an S/W program stored therein. For example, the computer program product may include a product (e.g., a downloadable application) that is electronically distributed as a software program through an electronic market (e.g., Google Play Store or AppStore) or a manufacturer of a device. For electronic distribution, at least a part of the software program may be stored in a storage medium or may be temporarily generated. In this case, the storage medium may be a server of the manufacturer, a server of the electronic market, or a storage medium of a relay server.

In a system including a server and a client device, the computer program product may include a storage medium of the server or a storage medium of the client device. When there is a third device (e.g., a smartphone) communicatively connected to the server or the client device, the computer program product may include a storage medium of the third device. The computer program product may include the S/VV program itself that is transmitted from the server to the client device or the third device or transmitted from the third device to the client device.

In this case, one of the server, the client device, and the third device may execute the computer program product to perform the method according to the described embodiments of the disclosure. Alternatively, two or more of the server, the client device, and the third device may execute the computer program product to perform the method according to the described embodiments of the disclosure in a distributed manner.

For example, the server (e.g., a cloud server or an AI server) may execute the computer program product stored in the server, to control the device communicatively connected to the server to perform the method according to the described embodiments of the disclosure.

For another example, the third device may execute the computer program product to control the device in communication with the third device to perform the method according to the embodiment of the disclosure. When the third device executes the computer program product, the third device may download the computer program product from the server and execute the downloaded computer program product. Alternatively, the third device may execute the provided computer program product provided in a preloaded manner to perform the method according to embodiments of the disclosure.

Also, the term "unit" used herein may be a hardware component such as a processor a circuit and/or a software component executed in a hardware component such as a processor.

While the disclosure has been illustrated and described with reference to various example embodiments thereof, it will be understood that the various example embodiments are intended to be illustrative, not limiting. It will be further understood by one of ordinary skill in the art that various changes in form and detail may be made without departing from the true spirit and full scope of the disclosure, including the following claims and their equivalents. For example, each component described in a single type may be executed in a distributed manner, and components described distributed may also be executed in an integrated form.

What is claimed is:

1. A computing device comprising:
    memory storing one or more instructions; and
    at least one processor configured to execute the one or more instructions stored in the memory to cause the at least one processor to:
        identify a classification system of a category of data comprising a classification criterion of the category of the data and a plurality of keywords;
        obtain data comprising at least one sentence; and
        determine at least one category with respect to the at least one sentence of the data based on the classification system of the category of the data using a neural network configured to perform classification by unsupervised learning,
    wherein the one or more instructions, when executed to determine the at least one category with respect to the at least one sentence of the data, cause the at least one processor to:
        generate first modification data in which words excluding words matching the plurality of keywords are removed from first training data;
        generate second modification data in which morphologically similar words of the words of the first modification data extend using an edit distance algorithm; and
        based on word embedding, generate second training data comprising a word vector in which semantically similar words of words of the second modification data extend.

2. The computing device of claim 1, wherein the one or more instructions, when executed, cause the at least one processor to:
    using the neural network, determine that the at least one category with respect to the at least one sentence cannot be determined according to the classification system of the category of the data;
    based on a result of the determining, update the classification system of the category of the data; and
    determine the at least one category with respect to the at least one sentence of the data, based on the updated classification system of the category of the data.

3. The computing device of claim 1, wherein the one or more instructions, when executed, cause the at least one processor to:
    determine a plurality of category candidates of the data using a first neural network; and
    using a second neural network, determine at least one category of the plurality of category candidates of the data as the at least one category with respect to the at least one sentence of the data.

4. The computing device of claim 1, wherein the data comprises social media data created by a plurality of users,
wherein the classification system of the category of the data comprises a classification system according to a product function, and
wherein the one or more instructions, when executed, cause the at least one processor to obtain requirements of the plurality of users based on the determined at least one category of the data.

5. The computing device of claim 1, wherein the one or more instructions, when executed, cause the at least one processor to:
generate the first training data obtained by performing pre-processing and sentence segmentation on the obtained data;
based on the first training data, generate the second training data comprising at least one of a morphologically similar word or a semantically similar word of a word for each sentence;
based on the second training data, generate third training data obtained by performing sentence embedding; and
based on the third training data, determine the at least one category with respect to the at least one sentence of the data according to the classification system of the category of the data.

6. The computing device of claim 5, wherein the one or more instructions, when executed, cause the at least one processor to:
based on the obtained data, perform sentence segmentation according to sentence boundary recognition, and
based on a result of the performing of the sentence segmentation, generate the first training data by removing unnecessary terms from the data.

7. The computing device of claim 5, wherein the one or more instructions, when executed, cause the at least one processor to:
obtain an average weight with respect to at least one word vector from the second training data;
smooth the obtained average weight using singular value decomposition (SVD); and
generate the third training data as a result of the performing of the sentence embedding using the smoothed average weight.

8. The computing device of claim 7, wherein the average weight with respect to the at least one word vector is obtained using a weight of the at least one word vector, based on a maximum likelihood estimate, and
wherein the weight of the at least one word vector includes a weight calculated with respect to at least one word using term frequency-inverse document frequency (TF*IDF).

9. The computing device of claim 5, wherein the one or more instructions, when executed, cause the at least one processor to:
determine a centroid that is most similar to the third training data among the classification system of the category of the data; and
determine the at least one category with respect to the least one sentence of the data, based on the determined centroid.

10. The computing device of claim 1, wherein the words matching the plurality of keywords comprise at least one of a word included in the plurality of keywords or a word matching the plurality of keywords based on approximate string matching.

11. A method of operating a computing device, the method comprising:
identifying a classification system of a category of data comprising a classification criterion of the category of the data and a plurality of keywords;
obtaining the data comprising at least one sentence; and
determining at least one category with respect to the at least one sentence of the data based on the classification system of the category of the data using a neural network that performs classification by unsupervised learning,
wherein the determining of the at least one category with respect to the at least one sentence of the data comprises:
generating first modification data in which words excluding words matching the plurality of keywords are removed from first training data;
generating second modification data in which morphologically similar words of the words of the first modification data extend using an edit distance algorithm; and
based on word embedding, generating second training data comprising a word vector in which semantically similar words of words of the second modification data extend.

12. The method of claim 11, further comprising:
using the neural network, determining that the at least one category with respect to the at least one sentence cannot be determined according to the classification system of the category of the data,
based on a result of the determining, updating the classification system of the category of the data, and
determining the at least one category with respect to the at least one sentence of the data, based on the updated classification system of the category of the data.

13. The method of claim 11, wherein the data comprises social media data created by a plurality of users, and
wherein the classification system of the category of the data comprises a classification system according to a product function,
the method further comprising obtaining requirements of the plurality of users based on the determined at least one category of the data.

14. The method of claim 11, wherein the determining of the at least one category with respect to the at least one sentence of the data comprises:
generating the first training data obtained by performing pre-processing and sentence segmentation on the obtained data;
based on the first training data, generating the second training data comprising at least one of a morphological similar word or a semantic similar word of a word for each sentence;
based on the second training data, generating third training data obtained by performing sentence embedding; and
based on the third training data, determining the at least one category with respect to the at least one sentence of the data according to the classification system of the category of the data.

15. The method of claim 14, wherein the generating of the third training data comprises:
obtaining an average weight with respect to at least one word vector from the second training data;
smoothing the obtained average weight using singular value decomposition (SVD); and
generating the third training data as a result of the performing of the sentence embedding using the smoothed average weight.

16. The method of claim 14, wherein the determining of the at least one category with respect to the at least one sentence of the data comprises:
- determining a centroid that is most similar to the third training data among the classification system of the category of the data; and
- determining the at least one category with respect to the least one sentence of the data based on the determined centroid.

17. The method of claim 11, wherein the words matching the plurality of keywords comprise at least one of a word included in the plurality of keywords or a word matching the plurality of keywords based on approximate string matching.

18. One or more non-transitory computer-readable recording media storing one or more programs, which, when executed by one or more processors of a computing device, cause the computing device to perform operations comprising:
- identifying a classification system of a category of data comprising a classification criterion of the category of the data and a plurality of keywords;
- obtaining the data comprising at least one sentence; and
- determining at least one category with respect to the at least one sentence of the data based on the classification system of the category of the data using a neural network that performs classification by unsupervised learning, wherein the determining of the at least one category with respect to the at least one sentence of the data comprises:
- generating first modification data in which words excluding words matching the plurality of keywords are removed from first training data;
- generating second modification data in which morphologically similar words of the words of the first modification data extend using an edit distance algorithm; and
- based on word embedding, generating second training data comprising a word vector in which semantically similar words of words of the second modification data extend.

* * * * *